United States Patent [19]

Hirose et al.

[11] Patent Number: 4,602,778
[45] Date of Patent: Jul. 29, 1986

[54] COPYING MACHINE EQUIPPED WITH A CORRECTION APPARATUS FOR DRAFT

[75] Inventors: Hiroshi Hirose, Sagamihara; Tokuzo Kaneda, Funabashi; Tomio Sasaki, Kawasaki; Kunio Hibi, Yokohama; Hitoshi Hoshi, Tokyo, all of Japan

[73] Assignee: Ricoh Co., Ltd., Tokyo, Japan

[21] Appl. No.: 692,491

[22] Filed: Jan. 18, 1985

[30] Foreign Application Priority Data

| Jan. 20, 1984 | [JP] | Japan | 59-8279 |
| Feb. 9, 1984 | [JP] | Japan | 59-20868 |
| Apr. 19, 1984 | [JP] | Japan | 59-79244 |
| Apr. 19, 1984 | [JP] | Japan | 59-79245 |
| Apr. 19, 1984 | [JP] | Japan | 59-79246 |
| Apr. 23, 1984 | [JP] | Japan | 59-81634 |
| Apr. 25, 1984 | [JP] | Japan | 59-61168 |
| May 7, 1984 | [JP] | Japan | 59-90710 |
| May 7, 1984 | [JP] | Japan | 59-66258 |

[51] Int. Cl.$^4$ ............................................. B65H 7/02
[52] U.S. Cl. ................................. 271/227; 271/261; 271/265
[58] Field of Search ............ 271/227, 258, 259, 261, 271/265, 9, 301

[56] References Cited

U.S. PATENT DOCUMENTS

| 4,316,667 | 2/1982 | Edwards | 271/301 X |
| 4,432,541 | 2/1984 | Clark | 271/301 X |
| 4,465,271 | 8/1984 | Saitoh | 271/227 |

*Primary Examiner*—Richard A. Schacher
*Attorney, Agent, or Firm*—Oblon, Fisher, Spivak, McClelland & Maier

[57] ABSTRACT

A copying machine which takes copies of a draft sheet by slit exposure while it is being conveyed. This copying machine includes a draft correction apparatus. This draft correction apparatus is provided with holding bars attached to a copying machine body so as to turn round the center line of a convey way for the draft, a pair of curved guide plates leaving therebetween a distance sufficient for forming a curved convey way constituting a part of said convey way, at least a pair of solenoids which are attached to the copying machine body on both sides of the draft convey way for turning said holding bars, draft sensors which are provided corresponding to said solenoids on both sides of the center line of the draft convey way this side of the solenoids, and a control means which inputs detection signals from the draft sensors and outputs working signals corresponding thereto against solenoids.

9 Claims, 39 Drawing Figures

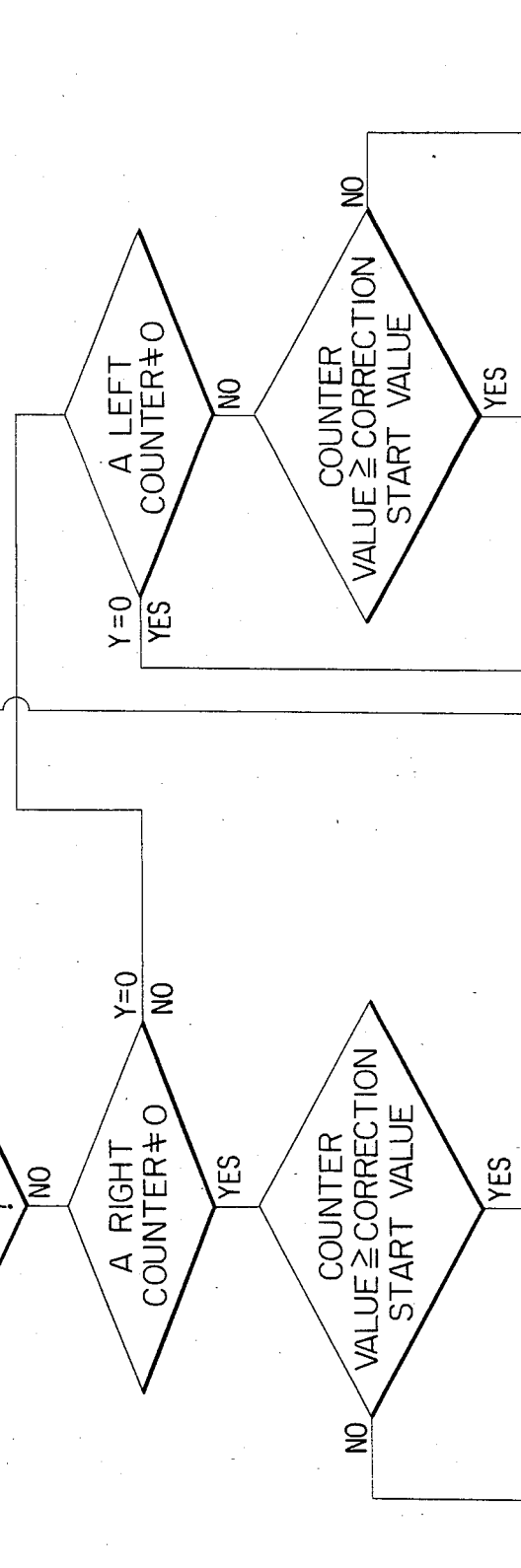

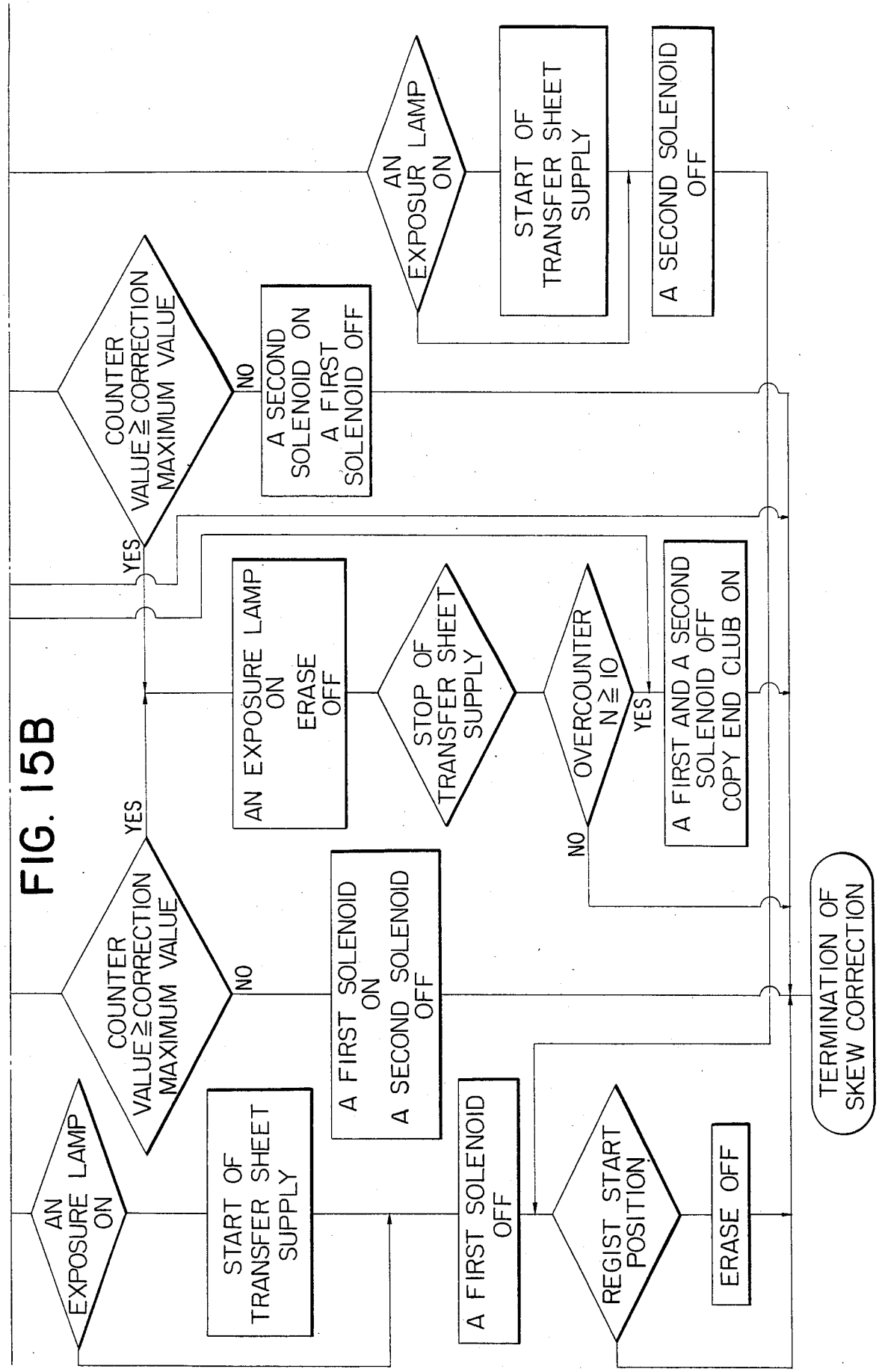

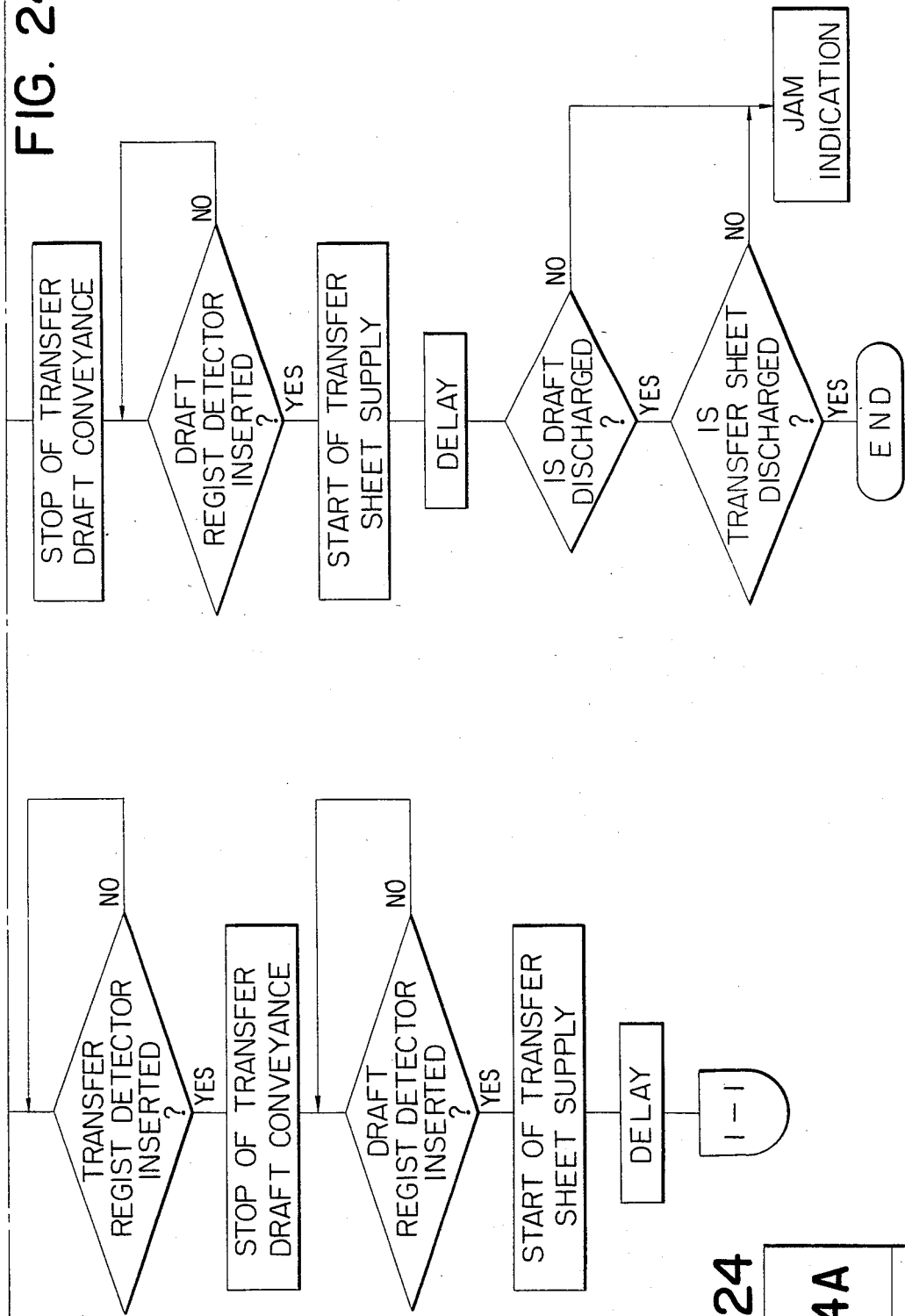

|    | P2 | P1 | P0 |
|----|----|----|----|
| A4 | 1  | 1  | 1  |
| B4 | 1  | 1  | 0  |
| A3 | 1  | 0  | 0  |

COPYING MACHINE EQUIPPED WITH A CORRECTION APPARATUS FOR DRAFT

FIELD OF THE INVENTION

This invention relates to a copying machine equipped with an apparatus correcting skew of a draft sheet to be conveyed.

BACKGROUND OF THE INVENTION

This invention relates particularly to a copying machine wherein copying is effected by subjecting a draft sheet during conveyance to slit exposure.

The copying machine of this sort involves the problems that in case a draft sheet during conveyance skews, a copied image is slant, and much the worse, a copied image breaks off.

In order to prevent such problems from occurring, there is proposed a copying machine equipped with a correction apparatus as disclosed in Japanese Laid Open Patent Application No. 93848/1982. This copying machine employs a skew feed correction apparatus as shown in FIG. 1 and FIG. 2. This apparatus will be explained briefly. When a draft sheet 201 is conveyed in a skewed state as shown in FIG. 1, there is caused a time lag between the draft sheet sensing times by skew sensors 202, 203. If this time lag is more than a predetermined time, in case the sensor 202 has first sensed the draft sheet the sensor 202 actuates a solenoid 204, and contrarily in case the sensor 203 has first sensed the draft sheet the sensor 203 actuates a solenoid 205 respectively for tilting a correction means by $\alpha$ degree counterclockwise or clockwise with p as a fulcrum. And, skew correction is made when the draft sheet 201 is guided by a curved guide surface 208 of a guide means 207 and turned as shown in FIG. 2.

However, the copying machine of this sort is disadvantageous in that since said turning means is disposed in a convey way for the draft sheet, a convey passage is prolonged thereby to restrict the lay out of the machine. In addition thereto, this copying machine is disadvantageous in that since the correction means tilts by a predetermined degree $\alpha$ irrespective of many or few of the skewed amount, it leads to insufficient or over correction, and so pertinent correction is difficult; and that since the tilting angle $\alpha$ of the correction means is constant irrespective of great and small sizes of the draft sheet width, the correction amount of the small-wide draft sheet is less than that of the great-wide draft sheet and consequently it is difficult to do pertinent correction corresponding to the great or small width of the draft sheet and when the skewed amount is over the predetermined amount it is out of correction and so copying is effected using the non-corrected draft sheet so as to result in image-broken useless copies.

Furthermore, in case the length of the draft sheet is long the skew amount corrected by the guide means 207 is increased, and contrarilly in case the length of the draft sheet is short the skew amount to be corrected is decreased. Accordingly, the draft sheet circling type copying machine, wherein a lower convey way and an upper convey way communicating therewith are provided; said upper convey way is provided with plural guide means appearing and disappearing for circling the draft sheet to said lower convey way; one and the same draft sheet is conveyed many times repeatedly between both convey ways by the action of this guide means; and plural copies are generated from one and the same draft sheet, is also disadvantageous in that as the result of plural times of circulation, when the draft sheet is long the skew correction amount per one time is so large that over correction is likely to cause a skew on the opposite side, while when the draft sheet is short the skew correction amount per one time is so small that the skew correction amount increases gradually and ultimately the copied image breaks, whereby useless copies are generated.

Further, said draft sheet circling type copying machine is disadvantageous in that despite the possibility of sideslip of the draft sheet occurring in addition skew thereof, the usual correction apparatus is unable to detect this sideslip and consequently useless copies with broken image are produced.

SUMMARY OF THE INVENTION

An object of this invention is to provide a copying machine which is capable of eliminating defects inherent in the usual copying machine which has employed a turning means in the skew correction apparatus, decreasing the total length of the machine by dispensing with the turning means, and simplifying the lay out of the machine.

Said object can be achieved by providing a copying machine of this invention which includes a skew correction means, a skew sensing means and a controlling means; said skew correction means having a holding means pivotally supported on the copying machine body so as to turn round substantially along the center line of a convey way for a draft sheet, a correction means which is attached to said holding means and comprises a pair of curved plates leaving therebetween a sufficient distance for forming a curved convey way constituting part of said convey way and at least a pair of driving means which are attached to the copying machine body at both sides of the center line of the convey way and are arranged to turn the holding means connected to the copying machine body; said driving means being arranged to be operated by said controlling means when the detector signal transmitted from at least a pair of sensors of the skew sensing means is over the tolerable skew amount. That is, operation of the driving means turns the correction means. As the result of this turning, the passing through distance of the curved convey way is prolonged on one side of its center line as well as shortened on the other side thereof. Therefore, the preceding portion of the draft sheet is arranged to pass through the long distance portion of the convey way and the following portion of the draft sheet is arranged to pass through the short distance portion of the convey way. Thus, skew can be eliminated. The copying machine of this invention is so constructed that the correct apparatus can be made compact as a whole for shortening the convey way and the lay out of the machine is little restricted.

Another object of this invention is to provide a copying machine which is capable of effecting a pertinent skew correction by sensing a skew amount accurately, controlling the turning angle of a correction means corresponding to said skew amount and further stopping the operation of a copying means when the skew amount is over the allowable correction amount for preventing the occurrence of inferior copies.

Said object of this invention can be achieved by an embodiment including a pair of first and second driving means and a pair of first and second sensors, a clock pulse generator which emits a clock pulse at regular intervals, a first counter and a second counter which can input a first detection signal, a second detection signal and said clock pulse, and a first drive signal generating means and a second drive signal generating means, said first and second counters generating a first or second count signal from the time of input of said first or second detection signal to the time of input of the second or first detection signal, said first or second drive signal generating means outputting a first or second drive signal equivalent to the first or second count signal to be input, to a first or second drive means for driving the first or second drive means by the amount equivalent to said signal value, a comparison means which inputs the first or second count signal, compares this signal with the predetermined corrective skew amount and outputs a non-corrective signal when the first or second count signal is over said corrective skew amount, and a stop means which stops the operation of copying means upon input of the non-corrective signal. That is, the skew amount detected by the sensor is converted into the clock pulse, said pulse as it stands is used as the working amount of the drive means for the purpose of pertinently controlling the turning angle of the correction means, and the operation of the copying means is stopped when the skew amount becomes so large that the above mentioned correction is impossible, thereby preventing the generation of useless copies.

A further object of this invention is to provide a copying machine which can control the oscillating angle of the correction means depending on the sizes of the draft sheet width and can achieve the skew correction pertinently irrespective of the sizes of the draft sheet width.

Said object of this invention can be achieved by an embodiment including at least four, namely first, second, third and fourth drive means and the same number of first, second, third and fourth sensors, the first and second drive means being located symmetrically far from the center line of the convey way, the third and fourth drive means being located symmetrically close to the center line of the convey way, the first, second, third and fourth sensors being disposed on the side corresponding to the first, second, third and fourth drive means respectively relative to the center line of the convey way for emitting the first, second, third and fourth detection signals, and a control means having the clock pulse generating means which emits the clock pulse at regular intervals, a third counter which can input the first or second detection pulse and the clock pulse and a fourth counter which can input the third or fourth detection signal and the clock pulse, wherein the third counter counts the number of clock pulses from the time of input of the first or second detection signal to the time of input of the second or first detection signal to thereby emit the third count signal, the fourth counter counts the number of clock pulses from the time of input of the third or fourth detection signal to the time of input of the fourth or third detection signal to thereby emit the fourth count signal, further the control means has the first and second comparison means which compare the third count signal to be imput with the predetermined first set value and output the first and second drive signals respectively when the third count signal is over the first set value, and the third and fourth comparison means which compare the fourth count signal to be input with the predetermined the second set value and output the third and fourth drive signals respectively when the fourth count signal is over the second set value, and the first, second, third and fourth drive means input the first, second, third and fourth drive signals to thereby oscillate the correction means by a predetermined angle. That is, the first and second drive means are used for the draft sheets of broad width and the third and fourth drive means are used for the draft sheets of narrow width. Due to this, the third count signal from the third counter is made shorter than the fourth count signal from the fourth counter, and the turning angle of the correction means by the first and second drive means is set to be smaller than the turning angle of the correction means by the third and fourth drive means, whereby the skew correction can be effected pertinently irrespective of the sizes of draft sheet width. In order to achieve the correction operation like this accurately, further, the embodiment of this invention includes a decision means of draft size which can input the first, second, third and fourth detection signals, said decision means being arranged to output a signal of broad width in case of input of the first or second detection signal and a signal of narrow width in case of input of the third or fourth detection signal respectively, a first stop means which stops the third and fourth comparison means in case of input of the signal of broad width and a second stop means which stops the first and second comparison means in case of input of the signal of narrow width, wherein the third and fourth drive means are arranged not to operate in the case of the draft sheet of broad width and the first and second drive means are arranged not to operate in the case of the draft sheet of narrow width so that the skew correction of draft sheets of broad and narrow width can be achieved without any confusion.

Still a further object of this invention is to provide a draft sheet circling type copying machine which is capable of changing the adjustable skew amount of draft sheet corresponding to its length and so effecting the skew correction pertinently irrespective of the length of draft sheet.

Said object can be achieved by a copying machine of this invention constructed so that a skew correction means of aforesaid construction is disposed between guide means of the upper convey way and a control means is arranged to operate a drive means selectively when the length signal and skew signal of a draft sheet are input and said skew amount becomes over the allowable skew amount equivalent to the length of said draft sheet. That is, when the length sensing means detects the draft sheet to be long, the skew correction means located this side of the guide means for use in said long draft sheet is operated, and when the draft sheet is short in contrast therewith, the skew correction means located this side of the guide means used for said short draft sheet is operated, and further the turning angle of the correction means of these skew correction apparatus is controlled, whereby the above mentioned pertinent skew correction equivalent to the length of the draft sheet can be effected.

Another important object of this invention is to provide a draft sheet circling type copying machine which is capable of not only achieving the skew correction but also preventing the occurrence of inferior copies caused by the sideslip of draft sheet.

Said object can be achieved by an embodiment of this invention including a sensor for sensing sideslip of draft sheet having a center sensor and right and left side sensors disposed on both sides of said center sensor leaving a space wider than the width of draft sheet therebetween, a clock pulse generator, a fifth counter which inputs the clock pulse generated by said clock pulse generator and the length signal generated by a length sensing means and counts the number of clock pulses to output a fifth count signal, a sixth counter which inputs the center signal coming from the center sensor and the clock pulse and counts the number of clock pulses to output a sixth count signal, a comparison means which counts the fifth and sixth count signals and outputs a comparison signal when the latter reaches ½ of the count number of the former, and a stop means which outputs a stop signal at the time of simultaneous input of the left or right side signal and the comparison signal. That is, the size of draft sheet is determined by the comparison signal, and when the side edge of said sized draft sheet is sensed by right and left side sensors disposed at the place spaced wider than the width of draft sheet this draft sheet is sensed to undergo sideslip. At that time, the stop means actuates a transfer means of a corresponding guide means by the input of the comparison signal and the right and left side signals to thereby withdraw said guide means, whereby the draft sheet is discharged in a draft receive member without cycling. Thus, the occurrence of useless copies can be prevented.

BRIEF DESCRIPTION OF THE DRAWING

In the drawing:

FIGS. 15A and 15B are flow diagrams of said microcomputer.

FIGS. 24A and 24B are operation flow diagrams of the copying machine of this invention having the skew correction means shown in FIG. 19.

DETAILED DESCRIPTION OF THE INVENTION

Figure 3:
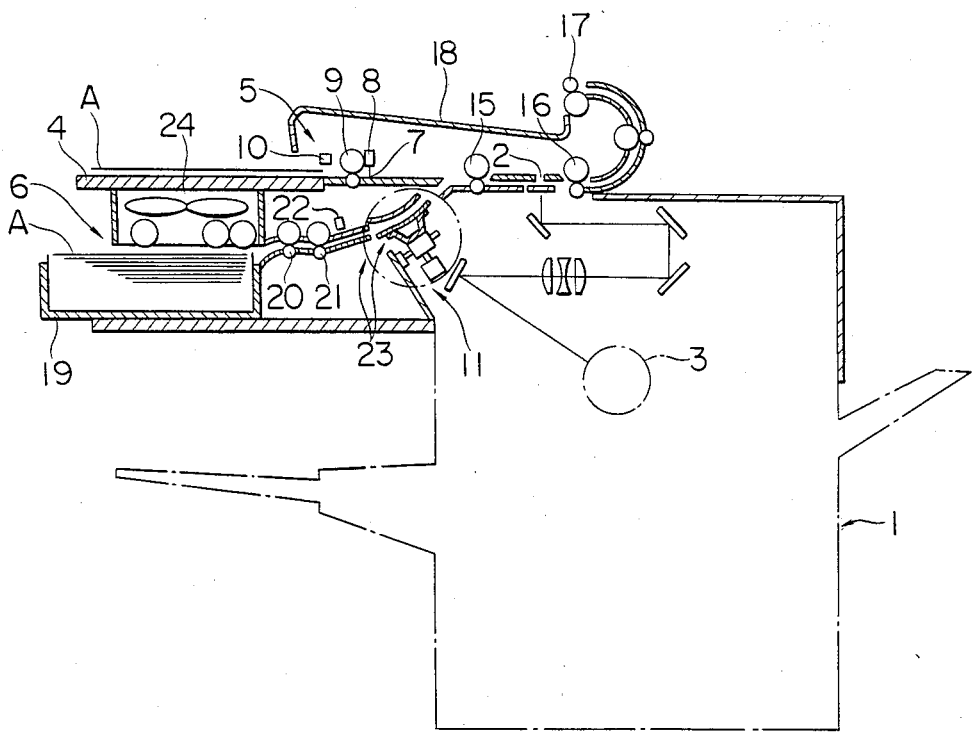
FIG. 3 is a vertical sectional front view of the main part of the embodiment of the copying machine according to this invention.

In FIG. 3, numeral 1 denotes a copying machine whose one side upper portion is provided with a table for manually feeding a draft 4 and means for manually feeding a draft succeeding thereto. This copying machine is identical with the conventional ones in this respect. In the copying machine like this, when a draft A on said table 4 is inserted manually and sensed by sensing means 10, a conveying roller 9 is opened, and the end of draft A abuts a gate for aligning a forward edge of draft and is aligned. Further, the draft A is sensed by sensing means for aligning a forward edge of draft 8, is pinched by the conveying roller 9 and is on standby. The draft A which is on standby like this is sent to an exposure slit 2 by a feed roller 15 in a manner well-timed with a transfer sheet fed by a means for feeding a transfer sheet (not shown), where copying is effected through the steps of forming an image on a sensitive member 3 by the aid of an optical system, making said image visible by treatment and fixing it on said transfer sheet. Thereafter, the draft A passes through a delivery roller 16 and a delivery portion 17, and is discharged in a draft receive member 18. During this process, the draft A is comparatively difficult to undergo skew. A tray or casette 19 is set to the lower portion of the table for manually feeding a draft A, and the draft A received herein is fed to the feed roller 15 through means for automatically feeding a draft (which will be called ADF hereinafter) 6. The succeeding operation is exactly the same as means for manually feeding a draft.

Then, reference will be made to the process until the draft A in the casette 19 is fed to the feed roller 15. The drafts A are fed to a separating roller 20 by the operation of a suction convey means 24 located upwards of the draft, where an uppermost draft A alone is separated, conveyed by a conveying roller 21, passed through a correction apparatus 11 having skew sensing means 22 and skew correction means 23, and fed to the feed roller 15. During this, its skew amount is sensed by the skew sensing means 22 and stopped, and is conveyed again in a manner well-timed with a transfer sheet as in the case of said manual feeding.

Hereinafter, the skew sensing means 22 and the skew correction means 23 will be explained.

Figure 4:
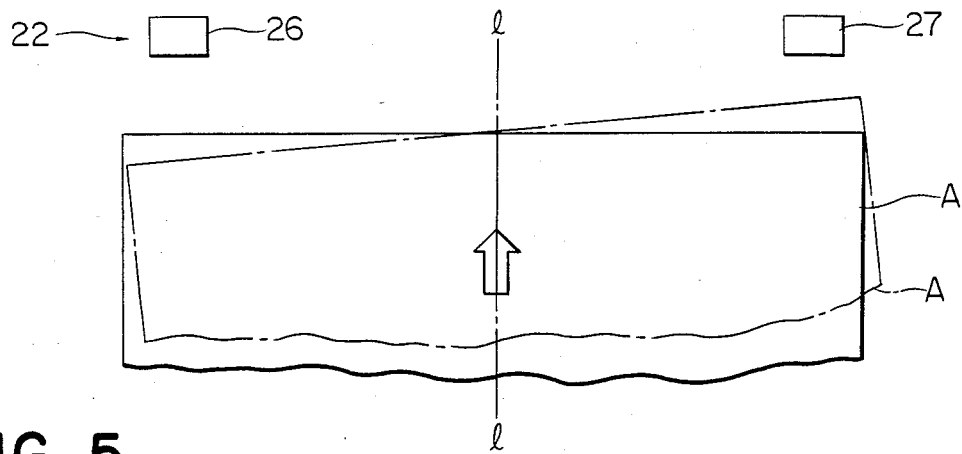
FIG. 4 is a view explaining the positional relationship between the draft sheet and the skew sensor in the embodiment of FIG. 3.

The skew sensing means 22 shown in FIG. 4 has a pair of first and second skew sensors 26, 27 disposed vertically relative to the conveying direction of draft A and symmetrically relative to the center line l—l of the draft, and these sensors 26, 27 are designed to sense the draft A to be conveyed succeedingly.

Figure 5:
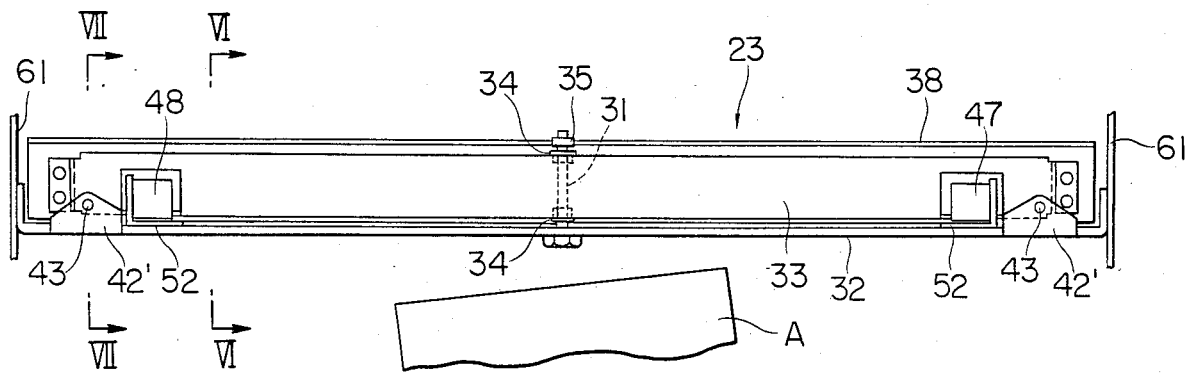
FIG. 5 is a plan view of the skew correction means shown in the embodiment of FIG. 3.
Figure 6:
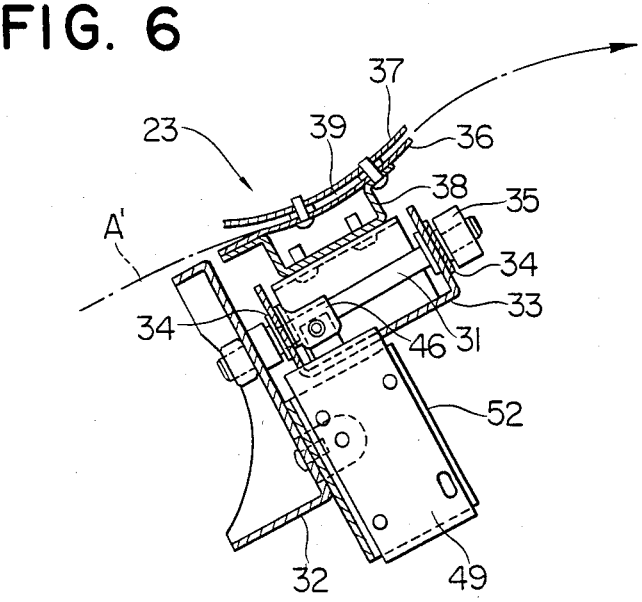
FIG. 6 is a sectional view taken in the direction of the arrows along the line VI—VI of FIG. 5.
Figure 7:
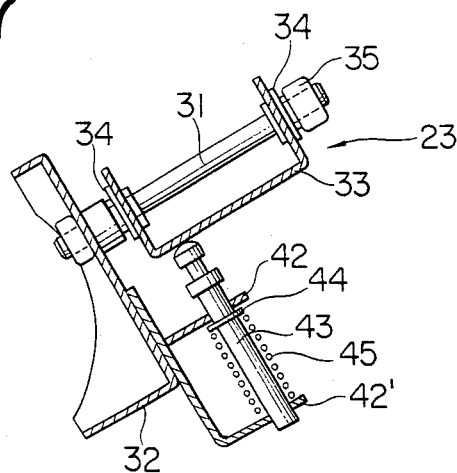
FIG. 7 is a sectional view taken in the direction of the arrows along the line VII—VII of FIG. 5.

Next, the skew correction means 23 will be explained. In FIGS. 5 to 7, a pivotal post 31 is erected substantially in the center of a beam-like supporting means 32 suspended between a pair of side plates 61 attached to a machine body 1, and about the center of a holding means 33 is rotatably supported on this pivotal post 31 by the aid of a bearing 34. To the draft convey way side of this holding means 23 there are attached circular arc-shaped inside and outside guide plates 36, 37 by a bracket 38 leaving a predetermined distance therebetween so as to form a convey way 39. The holding means 33 is located by a collar 35 in the thrust direction relative to the pivotal post 31. As illustrated in FIG. 7, two sets of supporting means having each pair of front or rear brackets 42, 42' are provided symmetrically on both sides of the pivotal post 31 at a place near the both end parts of the supporting means 32 and apart from the back surface of the holding means 33. A push means 43 is insert-fitted slidably in through holes formed in brackets 42, 42'. A flange 44 attached to the inside position of the bracket 42 of this push means 43 and a compression spring 45 interposed between the inside surfaces of the bracket 42' press the head of the push means 43 constantly against the back surface of the holding means 33 so that the holding means 33 may be held bisymmetically relative to the pivotal post 31 if no external force is exerted thereon.

A pair of first and second solenoids 47, 48 are provided through a bracket 52 at substantially symmetrical positions on both sides of the pivotal post 31 of the supporting means 32 with said pivotal post 31 as the center. A working bar for these solenoids 47, 48 is connected to an arm 46 attached to the holding means 33 and is designed to rotate the holding means 33 with the pivotal post 31 as the center keeping pace with the projection of the working bar of each solenoid 47, 48.

Figure 8:
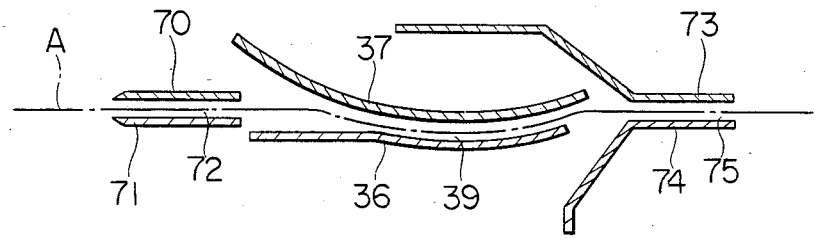
FIG. 8 is a grossly enlarged longitudinal section illustrating the state where the correction means of said skew correction means is in a neutral position.
Figure 9:
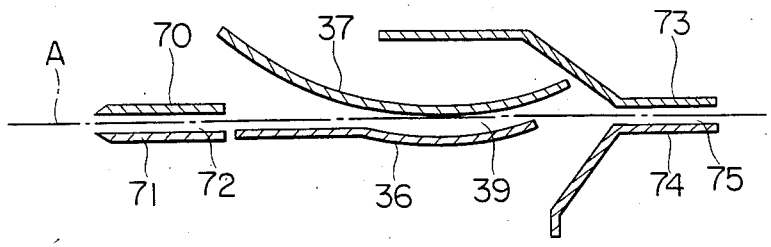
FIG. 9 is a similar view illustrating the state where the means shown in FIG. 8 is in an ascending position.
Figure 10:
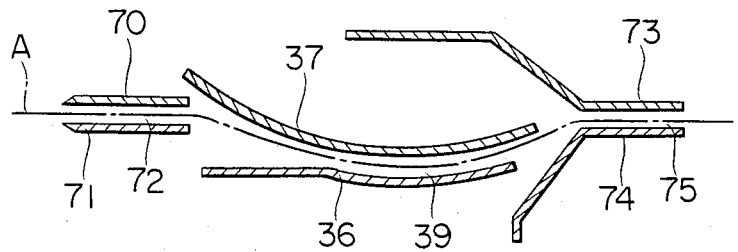
FIG. 10 is a similar view illustrating the state where the means shown in FIG. 8 is in a descending position.

Next, the construction of guide plates 36, 37 will be more detailed on the basis of FIGS. 8 to 10.

A curved convey way 39 formed between the guide plates 36, 37 is communicated with a convey way 72 formed between guide plates 70, 71 fixed within the copying machine body 1 and a convey way 75 formed in-between guide plates 73, 74 respectively so that the draft sheet A conveyed through the inside of the convey way 72 by the conveying roller 21 is always passed through the convey way 39 and fed to the convey way 75.

And, the convey way 39, which is in an equilibrium state (neutral position) by the aid of the push means 43, is located somewhat downwards of the convey ways 72, 75 (FIG. 8), and the draft sheet A fed from the convey way 72 passes through the convey way 39 while bending downwards. Then, when the holding means 33 is rotated with the pivotal post as the center by the operation of each of the first and second solenoids 47, 48, one side of the convey way 39 transfers from the neutral position to the ascending position (FIG. 9) and the other side transfers to the descending position (FIG. 10). At this time, the portion of the convey way 39 on the ascending side, as seen from FIG. 9, is arranged to communicate substantially linearly with the convey way 75 so that the portion of the draft sheet A passing through this position comes to pass through the inside of the convey way 39 at the shortest distance. The portion of the convey way 39 on the descending side, as seen from FIG. 10, is further curved downwards so that the portion of the draft sheet A passing through this position comes to pass through the inside of the convey way 39 at a further long distance as compared with the case of neutral position (FIG. 9). Accordingly, the draft sheet A passing through the inside of the convey way 39 in such a state that any of the solenoids 47, 48 has been operated and the holding means 33 has been rotated, comes to be different in conveying distance on both sides thereof.

Next, the skew correction operation of the above mentioned correction apparatus 11 will be explained. As aforesaid, the skew of draft sheet A is sensed by means of the first and second sensors 26, 27. When the draft A skewed as shown with the chain line of FIG. 4 or the solid line of FIG. 5 is conveyed, the second sensor 27 senses the end of the draft A before the first sensor 26 does and actuates the second solenoid 48 corresponding to this second sensor 27. Due to this, the holding means 33 is rotated, the side of second solenoid 48 is lifted, and the left side convey way 39 in FIG. 5 is set to the state shown in FIG. 9 and the right side convey way 39 is set to the state shown in FIG. 10. As the result, when the draft A passes through the convey way 39, the preceding, skewed end portion of draft A on the side of second sensor 27 passes through a long distance than the following end portion of draft A on the opposite first sensor 26 side does. Due to this difference in conveying distance between both ends of this draft A, the skew of draft A is corrected when it is fed to the convey way 75. When the draft A is skewed on the side opposite to the above mentioned, the skew is corrected likewise by operating the first sensor 26 and the first solenoid 47.

Figure 11:
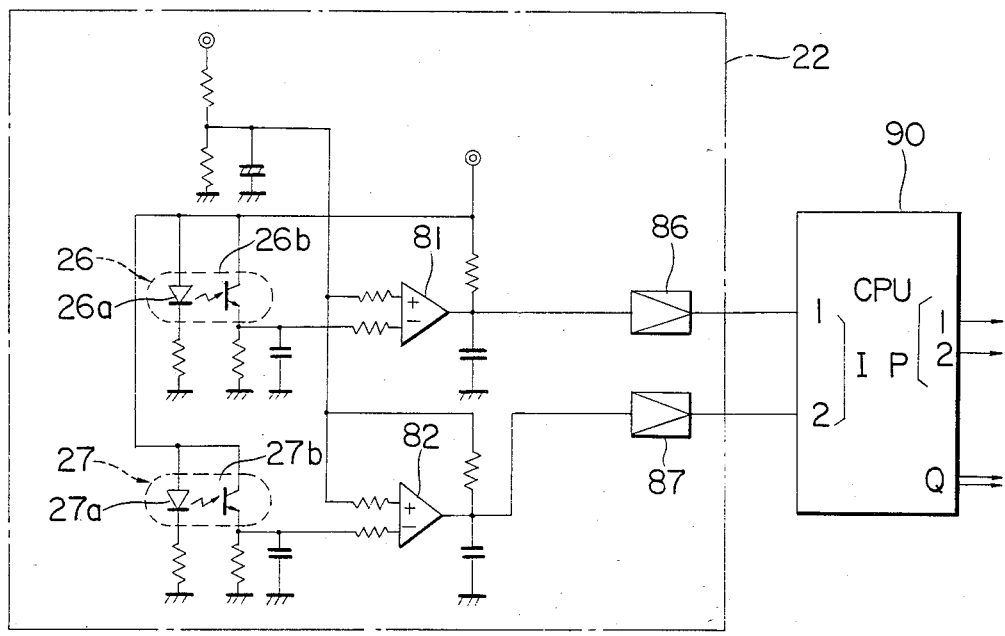
FIG. 11 is a circuit diagram used for controlling said skew correction means.

FIG. 11 illustrates a circuit example for use in controlling the skew correction means 23. In the skew sensing means 22, the first and second sensors 26, 27 is constructed of a luminous diodes 26a, 27a and a photo transistor 26b, 27b. When the light emitted from the luminous diode 26a, 27a is reflected by the draft, the photo transistor is ON and H level signals are output from comparators 81, 82 and input in the input port 1-1.2 of a microcomputer 90 respectively through amplifiers 86, 87.

Figure 12:
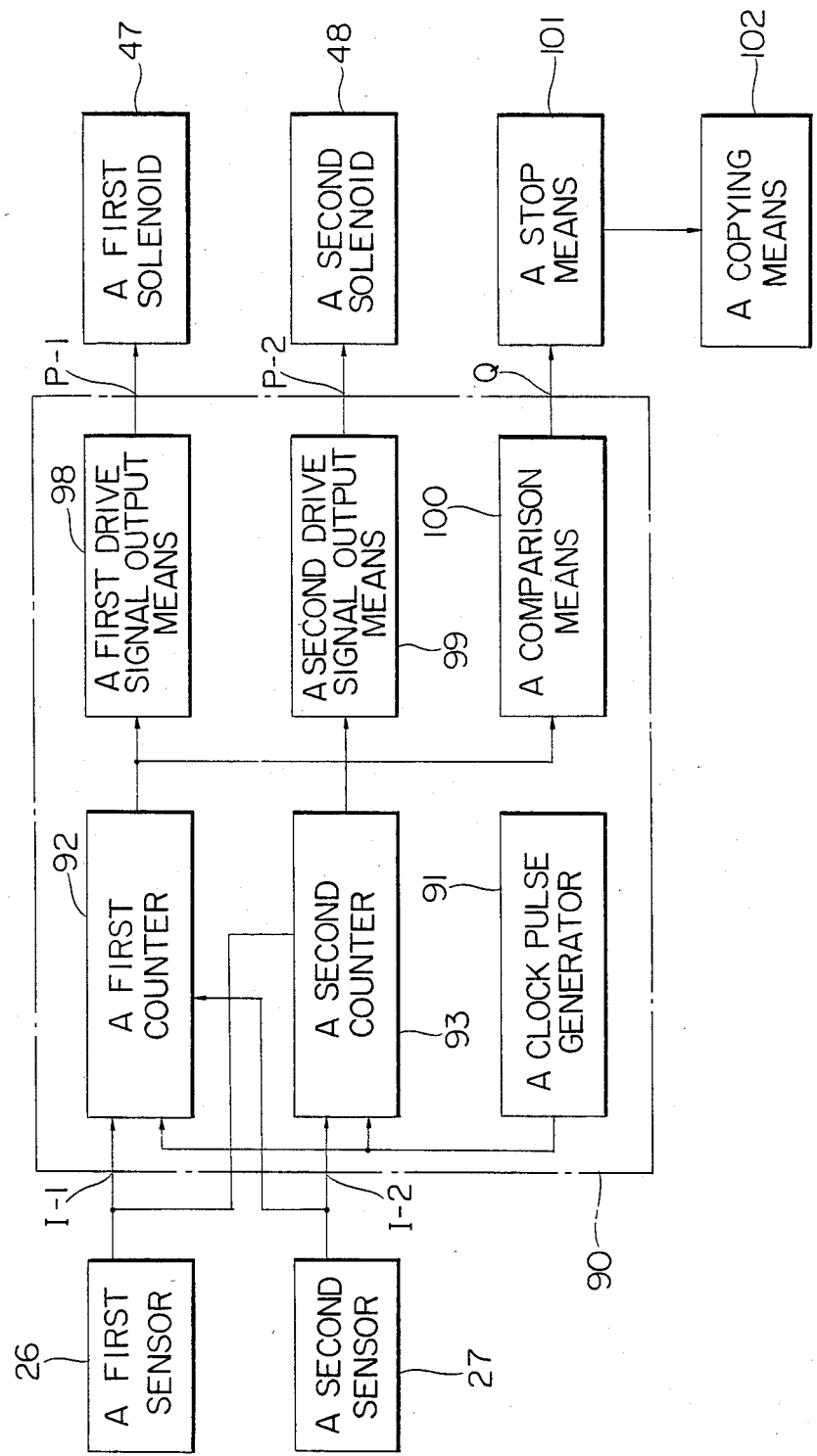
FIG. 12 is a block diagram of the control means of the skew correction means.

Said microcomputer 90, as shown in FIG. 12, includes a clock pulse generator 9, first and second counters 92, 93, first and second drive signal generating means 98, 99 and a comparison means 100. When the first sensor first senses the draft, the first counter 92 is actuated to count the number of clock pulses output from a clock pulse generator 91 and stop the count when the second sensor 27 senses the draft. The first counter outputs the counted number as a first count signal. In contrast, when the sensor 27 first senses the draft, the second counter 93 is actuated to count the number of clock pulses and stop the count when the first sensor 26 senses the draft, and the second counter 93 outputs the counted number as a second count signal.

Next, explanation will be made on the performance of aforesaid embodiments.

Figure 13:
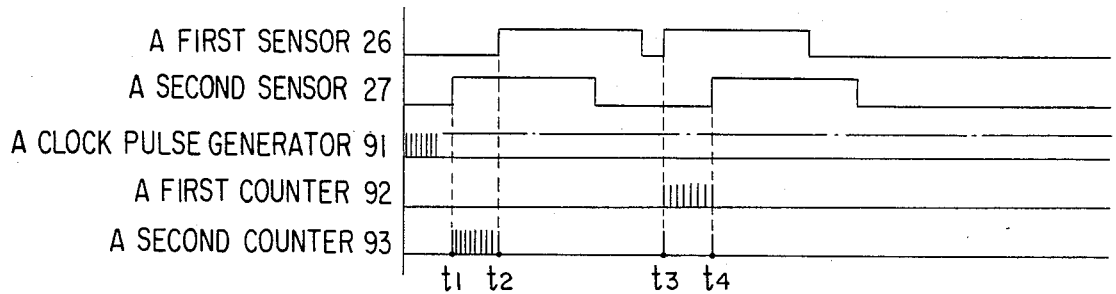
FIG. 13 is a time chart of the control means of FIG. 12.
Figure 14:
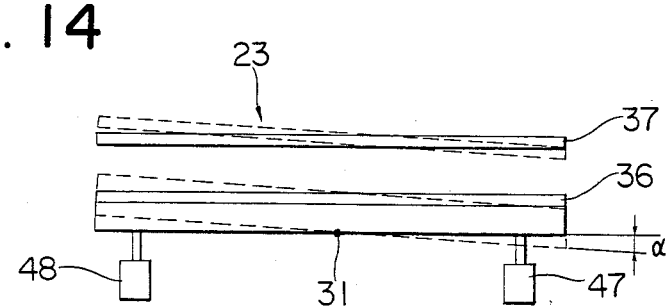
FIG. 14 is a view explaining the turning state of said skew correction means.

When the draft A skewed as shown in FIG. 4 is conveyed, the second sensor 27 first senses the draft A, H level signal is output from the comparator 82 and input in the input port 1-2 of the microcomputer 90. And, the second counter 93 counts the number of clock pulses output from the clock pulse generator 91 ($t_1$ in FIG. 13) and stops the count when the draft A is further conveyed and sensed by the first sensor 26 ($t_2$ in FIG. 13). Due to this, the second counter 93 inputs the second count signal in the second drive signal generating means 99, said generating means 99 outputs the second drive signal corresponding thereto from the output port P-2 to thereby actuate the second solenoid 48, and the skew correction means 23 is rotated by the angle $\alpha$ clockwise as shown in FIG. 14.

In case the draft A is skewed in the direction opposite to that illustrated and conveyed, the sensor 26 first senses the draft ($t_3$ in FIG. 13) and H level signal is output from the comparator 81 and input in the input port 1-1 of the microcomputer 90. And, the first counter 92 counts the number of clock pulses in the same manner as aforesaid and stops the count when the second sensor 27 senses the draft ($t_4$ in FIG. 13). Thus, the first counter 92 inputs the first count signal in the first drive signal generating means 98, said generating means 98 outputs the first drive signal corresponding to said first count signal from the output port P-1 for actuating the first solenoid 47, and the skew correction means 23 is rotated counterclockwise in FIG. 14.

In the above mentioned case, the first and second count signals are simultaneously input in the comparison means 100, these signals are compared here with the correctable maximum skew amount set beforehand in the comparison means 100, when the first and second count signals become over this set value said comparison means 100 output excess signals from an output port Q, this excess signal is input in a stop means 101, the output of a copying signal for the copying machine is stopped by a stop signal output from said stop means 101 when the draft sheet passes through the exposure slit (FIG. 3), and the draft A is discharged in the draft receive member 18 without being subjected to copying operation, whereby the occurrence of useless copies can be prevented.

FIG. 15 illustrates a flow diagram of the microcomputer 90 in the above mentioned case.

Figure 16:
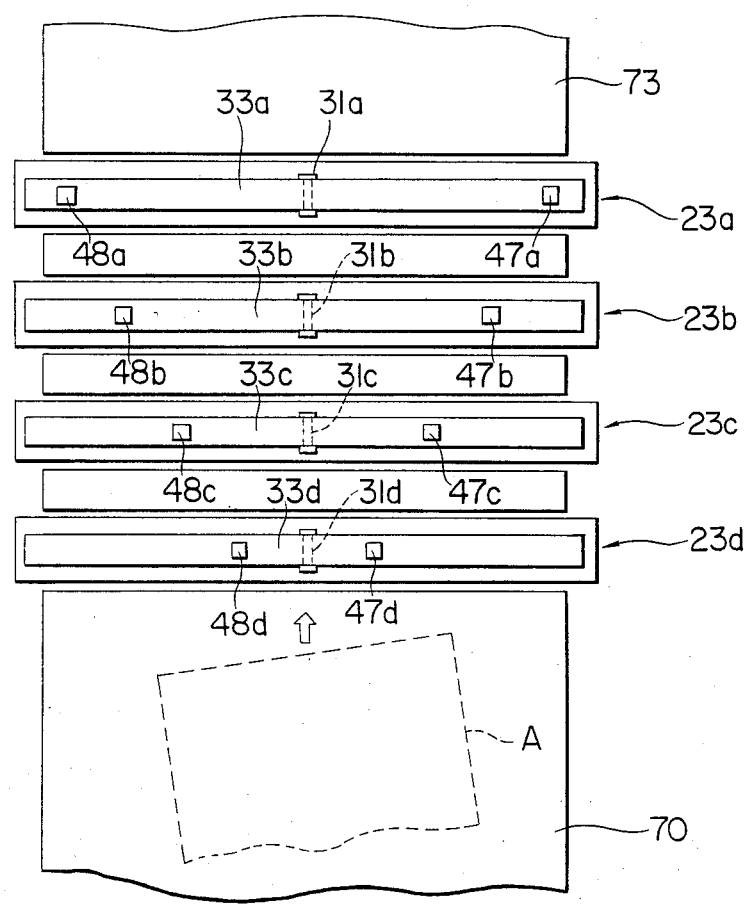
FIG. 16 is a plan view of the main part of another embodiment of the copying machine according to this invention equipped with plural pairs of said skew correction means.

FIG. 16 illustrates the copying machine wherein four aforesaid skew correction means 23a, 23b, 23c and 23d are provided in the conveying direction of draft sheet, and four skew correction means each has a pair of first and second solenoids such as 47d, 48d; 47c, 48c; 47b, 48b; and 47a, 48a, which are disposed so that the distances between the respective pairs of solenoids extend with the progress from this side of the conveying direction of draft sheet A to the rear side. As regards the slant amounts of holding means 53a, 53b, 53c and 53d caused by the operation of respective solenoids in each pair, accordingly, said slant amount is largest in the skew correction means 23d, and decreases with the progress to the rear direction.

Figure 17:
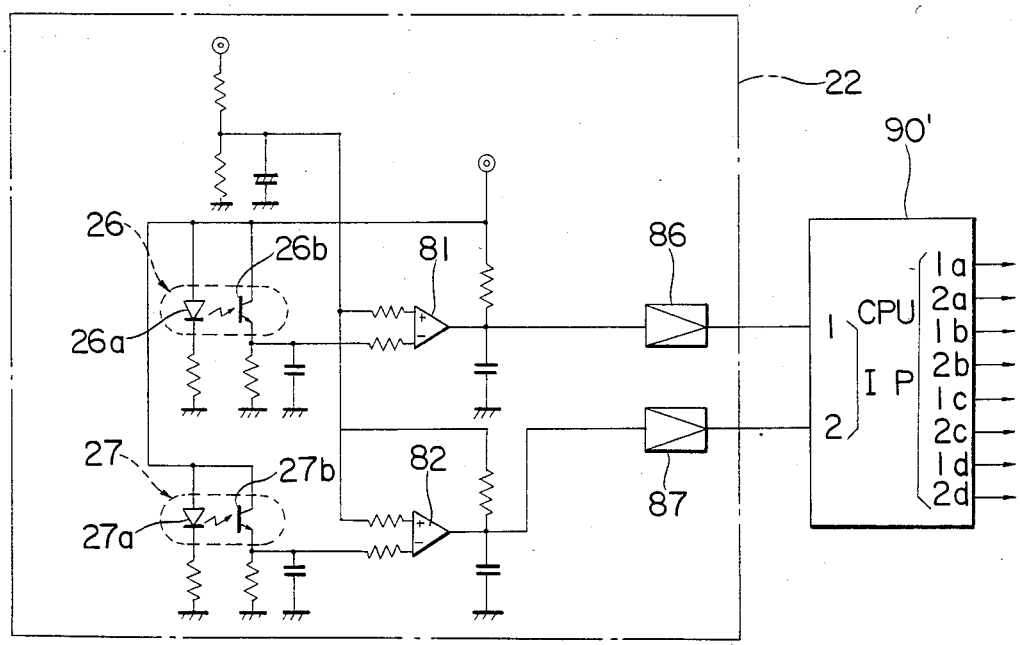
FIG. 17 is a circuit diagram used for controlling the skew control means of FIG. 16.

The skew sensing means 22 for selectively actuating the above mentioned skew correction means 23a, 23b, 23c, 23d respectively is shown in FIG. 4. The explanation thereof with reference to FIG. 4 is as given above. However, the microcomputer 90' is different from the above mentioned one, namely the one as shown in FIG. 17. The difference of this microcomputer 90' from the above mentioned one consists in that the former is provided with a total of eight output ports P-1a-1d; P-2a-2d, among which the ports P-1a-1d are designed to output against the solenoids 47a-47d of the correction means 23a-23d respectively and ports P-2a-2d are designed to output against the solenoids 48a-48d. In addition thereto, the computer 90' includes a first - fourth setting means (not shown), and the first and second count signals are imput to these first - fourth setting means from the input port I-1.2. And, a first set number to a fourth set number are set beforehand in these first - fourth setting means, said first - fourth set numbers comprising dividing the count number of clock pulses arranged in order from a small number to a large number into the predetermined ranges respectively.

In this case, when the first sensor 26 first senses the draft, the first count signal of the first counter 92 is compared with said first - fourth set number ranges set beforehand in the setting means, if the first count signal is within the range of first set number, the first setting means outputs a first drive signal to the 1-1 solenoid 47a through the output port P-1a, if the first count signal is within the range of second set number, the second setting means outputs a second drive signal to the 1-2 solenoid 47b through the output port P-1b, if the first count signal is within the range of third set number, the third setting means outputs a third drive signal to the 1-3 solenoid 47c through the output port P-1c, and if the first count signal is within the range of fourth set number, the fourth setting means outputs a fourth drive signal to the 1-4 solenoid 47d through the output port P-1d.

In contrast, when the second sensor 27 first senses the draft, the second count signal of the second counter 93 is compared with said first - fourth set number ranges set beforehand in the setting means, if the second count signal is within the range of first set number, the first setting means outputs a first drive signal to the 2-1 solenoid 48a through the output port P-2a, if the second count signal is within the range of second set number, the second setting means outputs a second drive signal to the 2-2 solenoid 48b through the output port P-2b, if the second count signal is within the range of third set number, the third setting means outputs a third drive signal to the 2-3 solenoid 48c through the output port P-2c, and if the second count signal is within the range of fourth set number, the fourth setting means outputs a fourth drive signal to the 2-4 solenoid 48d through the output port P-2d.

When the amount of rotation by solenoids 47a, 48a is valued $\alpha_1$, the amount of rotation by solenoids 47b, 48b is valued $\alpha_2$, the amount of rotation by solenoids 47c, 48c is valued $\alpha_3$ and the amount of rotation by solenoids 47d, 48d is valued $\alpha_4$, the relationship of $\alpha_1 < \alpha_2 < \alpha_3 < \alpha_4$ should be exist between these amounts of rotation in this instance.

Accordingly, when the skew amount of the draft sheet A corresponding to each of the aforesaid established numbers of the first to fourth setting means and the skew correction amount of each of the skew correction means 23a, 23b, 23c, 23d are set in the setting means so that said amounts may become equal, any of the skew correction means corresponding to the skew amount is actuated, whereby the skew correction can be effected pertinently.

Figure 18:
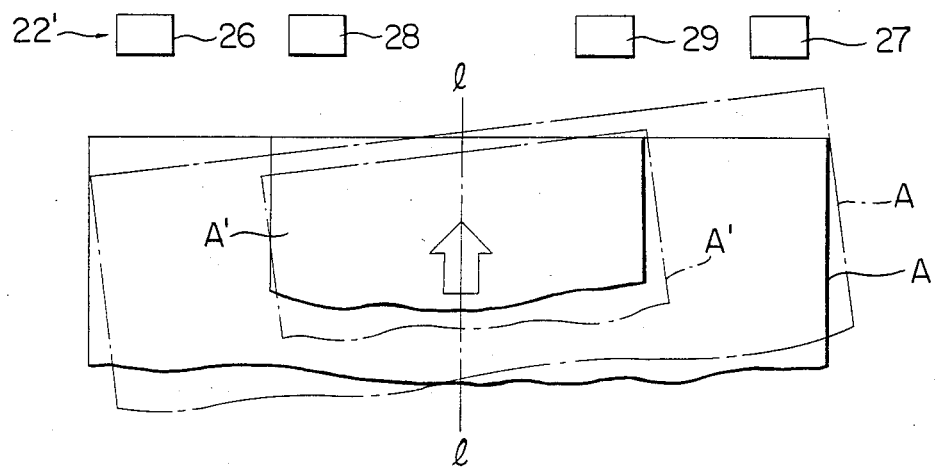
FIG. 18 is an explanatory view showing the positional relationship between the draft sheet and skew sensors in the embodiment of this invention having four skew sensors.

FIG. 18 illustrates the positional relationship between the skew sensing means and the draft sheet of another embodiment of the copying machine according to this invention. This skew sensing means 22' includes the third and fourth sensors 28, 29 which are disposed between the first and second sensors 26, 27 and located symmetrically relative to the center line 1—1 of the draft sheet.

Figure 19:
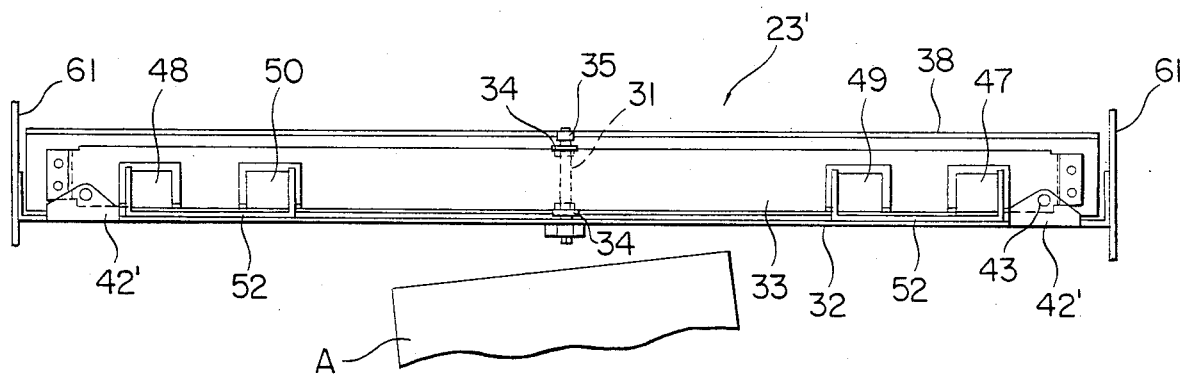
FIG. 19 is a plan view of the skew correction means in the embodiment shown in the preceding figure.

The skew correction means 23' includes the third and fourth solenoids 49, 50 which are disposed between the first and second solenoids 47, 48 and correspondingly to the third and fourth sensors 28, 29 as shown in FIG. 19. Explanation on the structure of said third and fourth solenoids 49, 50 is omitted because said structure is identical with that of the first and second solenoids 47, 48. Hereat, the first and second solenoids 47, 48 are used for skew correction of the draft sheet A of broad width shown in FIG. 18, and the third and fourth solenoids 49, 50 are used for skew correction of the draft sheet A' of narrow width. The correction operation of the third and fourth solenoids 49, 50 is conducted by the detection signals of the third and fourth sensors 28, 29 in the exactly same manner as described above with reference to the first and second solenoids 47, 48. The reason why the solenoids are divided into the one for use in the draft sheet of broad width and the one for use in the draft sheet of narrow width despite this will be given as follows.

Generally speaking, it is also possible to effect the skew correction of both large and small sized draft sheets by the use of a pair of sensors and a pair of solenoids as shown in the aforesaid embodiments. However, the difference in conveying distance between both sides of the convey way 39 increases with going away from the center to both sides. This leads to that if the inclined angle of the holding means 33 is adjusted so as to meet the skew correction of the draft A of broad width when correcting the drafts of broad and narrow width skewed in the same degree, the draft sheet A' of narrow width whose side end portion passes inside than the side end portion of this draft sheet A is short of the difference in the conveying distance in the convey way 39. When the draft sheet A of broad width is corrected, contrarily, the difference in the conveying distance is so large that over skew correction is effected, resulting in skew in the opposite direction. This can be corrected by disposing private solenoids corresponding to each width and obtaining the inclined angle of the holding means 33 corresponding to the width of draft.

Figure 20:
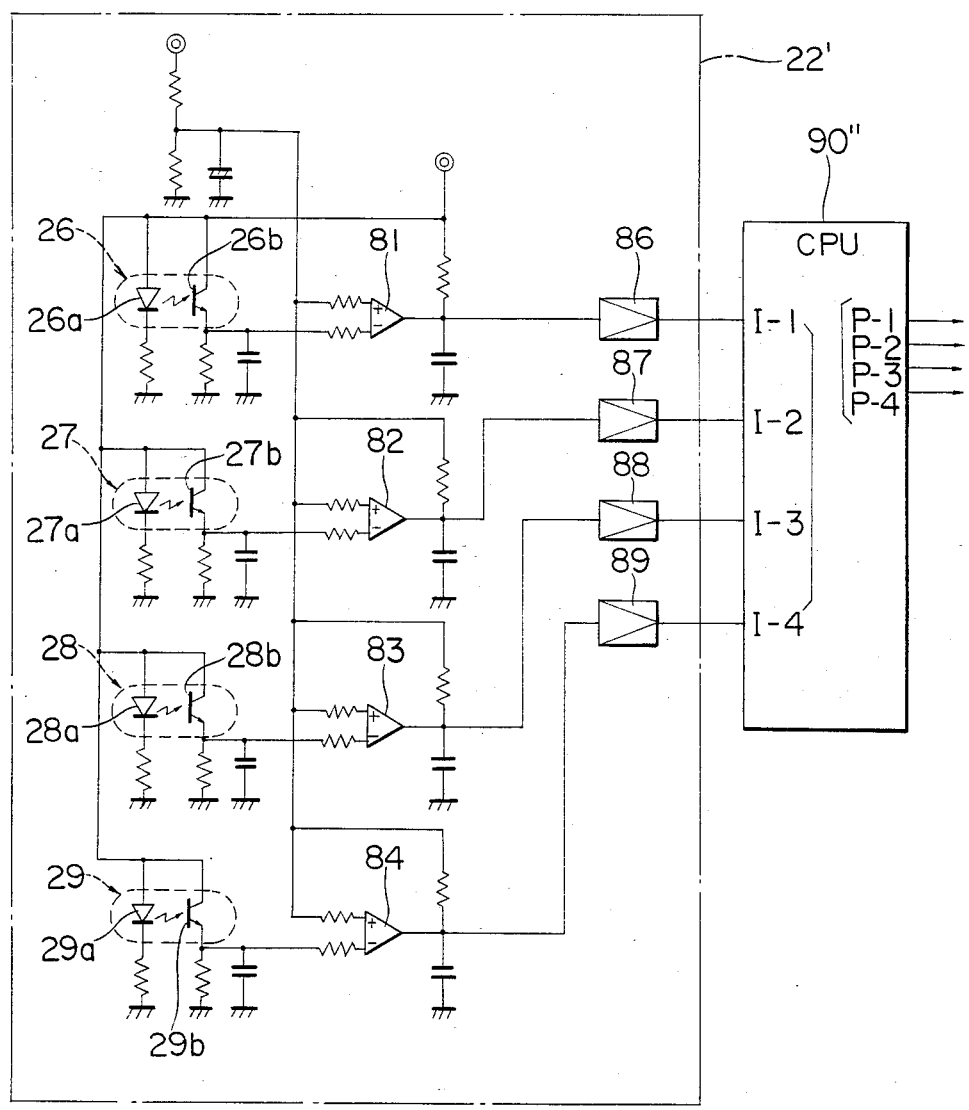
FIG. 20 is a circuit diagram used for controlling the skew correction means shown in the preceding figure.
Figure 21:
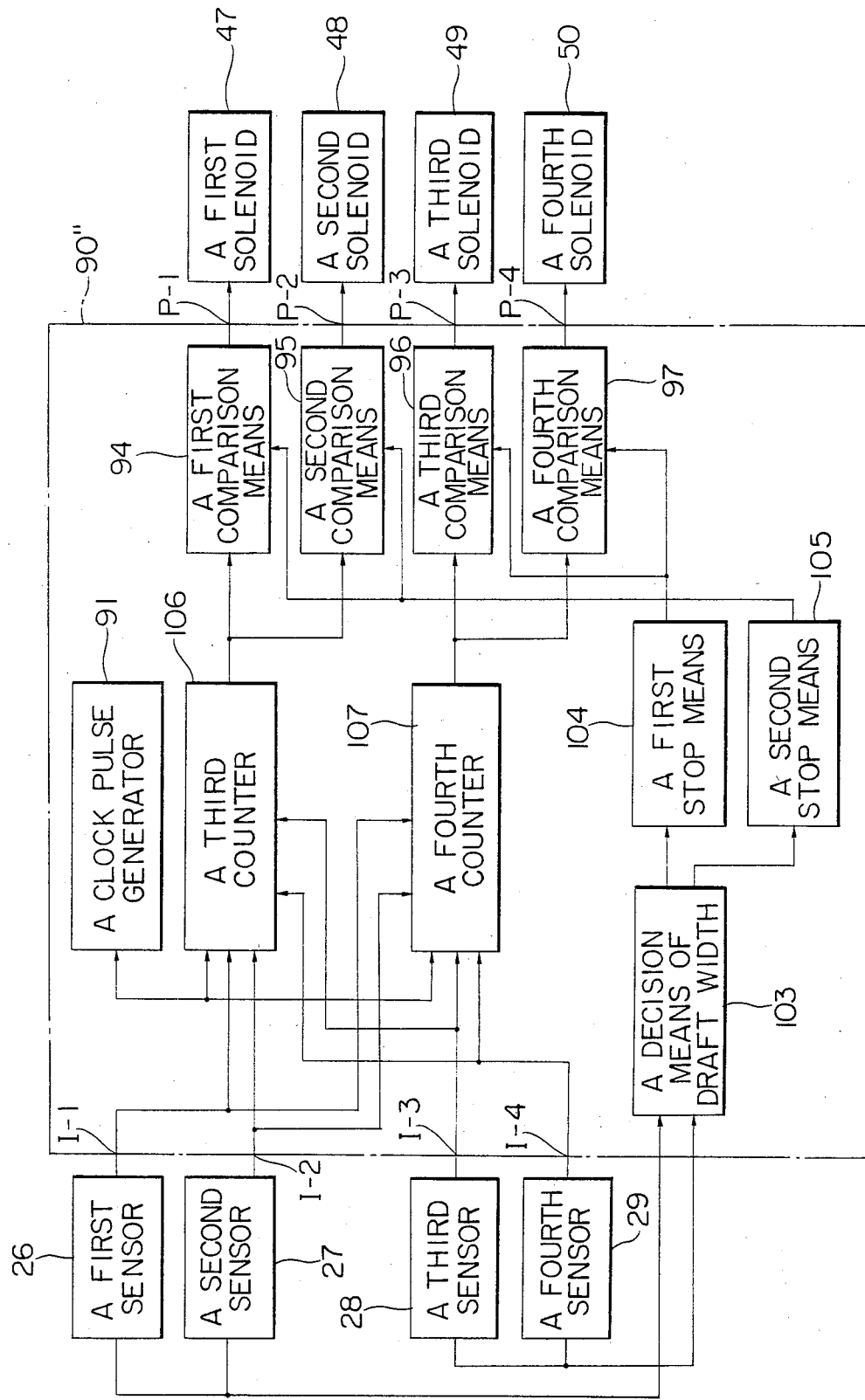
FIG. 21 is a block diagram of the control means of the skew correction means shown in the preceding figure.

FIGS. 20 and 21 each illustrates a control circuit used for controlling the skew correction means 23' of this embodiment. This control circuit is partly the same as those shown in FIG. 11 and FIG. 12. Therefore, the same symbols will be attached to the same parts, and explanation will be made about the other parts. In FIG. 20, 28a and 29a denote the same luminous diodes as denoted by 26a and 27a, 28b and 29b denote the same photo transistors as denoted by 26b and 27b, 83 and 84 denote the same comparators as denoted by 81 and 82, 88 and 89 denote the same amplifiers as denoted by 86 and 87, I-3 and I-4 denote the same input ports as denoted by I-1 and I-2, and P-3 and P-4 denote the same output ports as denoted by P-1 and P-2, respectively.

In FIG. 21, furthermore, 94, 95, 96 and 97 denote first, second, third and fourth comparison means respectively. The first and second comparison means 94, 95 are beforehand provided with the first set number necessary for starting the skew correction of the draft sheet A of broad width. The third and fourth comparison means 96, 97 are beforehand provided with the second set number necessary for starting the skew correction of the draft sheet A' of narrow width. These set numbers are compared with the first and second count signals to be input from the third and fourth counters 106, 107.

In FIG. 21, furthermore, 103 denotes a decision means of draft width, and 104 and 105 denote the first and second stop means respectively. The decision means of draft width 103 outputs a broad width signal upon input of the first or second detection signal from the first or second sensor 26 or 27. The first stop means 104 inputs this signal to stop the third and fourth comparison means 96, 97. When the decision means of draft width 103 inputs the third or fourth detection signal from the third or fourth sensor 28 or 29, contrarily, said decision means 103 outputs a narrow width signal. The second stop means 105 inputs this to stop the first and second comparison means 96, 97.

Next, the operation of this embodiment will be explained.

Figure 23:
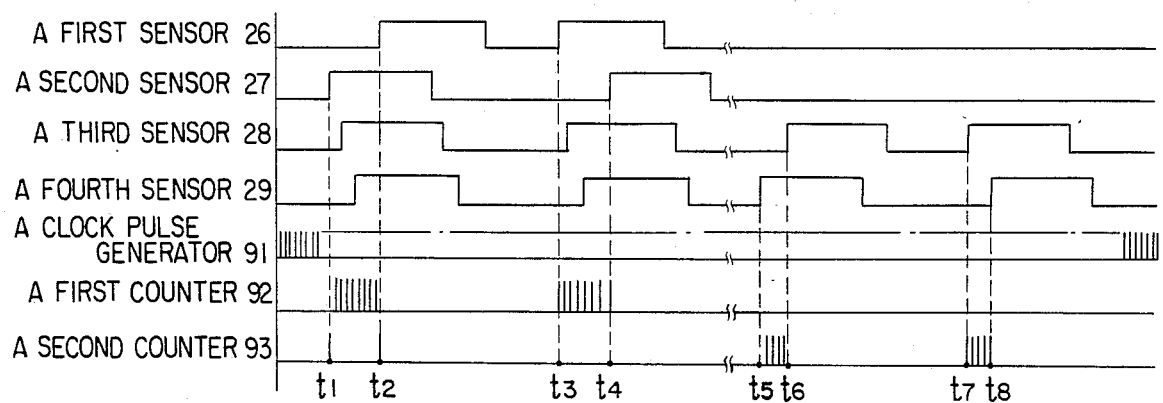
FIG. 23 is a time chart of the control means of the skew correction means shown in FIG. 12.

When the draft A skewed as shown in FIG. 18 is conveyed, the second sensor 27 first senses said draft A, H level signal is output from the comparator 82, and this signal is input in the input port 1-2 of a microcomputer 90''. And, a third counter 106 counts the number of clock pulses output from the clock pulse generator 91 ($t_1$ in FIG. 23).

Figure 22:
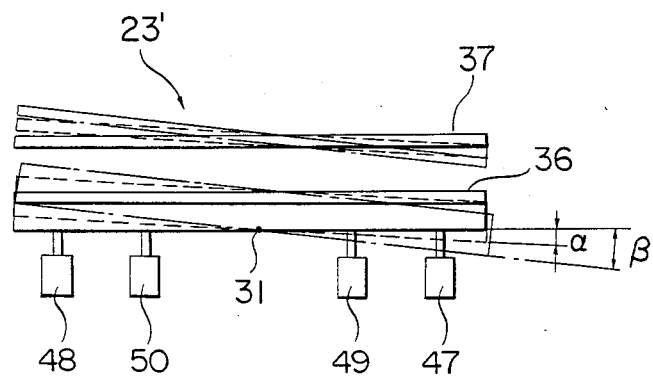
FIG. 22 is a view explaining the turning state of the skew correction means shown in FIG. 19.

The draft is further conveyed and sensed by the first sensor 26 ($t_2$ in FIG. 23), the count made by the third counter 106 stops. And, said count number is input in the second comparison means 95 as the third count number. Hereat, this count number is compared with the predetermined first set number. In case the third count number is over the first set number, a drive signal is output from the output port P-2, and the second solenoid 48 is actuated for tilting a skew correction means 23' by $\alpha$ degree clockwise with the pivotal post 31 as the fulcrum as shown in FIG. 22.

In case the draft A is skewed in the direction opposite to that illustrated and conveyed, the first sensor 26 first senses the draft ($t_3$ in FIG. 23) and H level signal is output from the comparator 81 and input in the input port 1-1 of the microcomputer 90. And, the third counter 106 counts the number of clock pulses in the same manner as mentioned above until the second sensor 27 senses the draft A ($t_4$ in FIG. 23), and thereafter the count made by the third counter 106 stops. And, said count number is input in the first comparison means 94 as the third count number and compared here with the predetermined first set number. In case the third count number is over the first set number, a drive signal is output from the output port P-1 for actuating the first solenoid 47, whereby tilting the skew correction means 23' by $\alpha$ degree counterclockwise.

In case the draft A' of narrow width skewed as shown in FIG. 18 is conveyed, the fourth sensor 29 senses said draft, and H level signal is output from the comparator 89 and input in the input port I-3 of the microcomputer 90". And, the fourth counter 107 counts the number of clock pulses ($t_5$–$t_6$ in FIG. 23) in the same manner as mentioned above until the third sensor 28 senses the draft A', and then the fourth counter 107 stops. Said count number is input in the fourth comparison means 97 as the fourth count number and compared here with the predetermined second set number. In case the fourth count number is over the second set number, a drive signal is output from the output port P-4 for tilting the skew correction means 23' by $\beta$ degree ($>\alpha$) clockwise in the same manner as aforesaid (FIG. 22). In case the draft A' skewed in the direction opposite to that illustrated is conveyed, the third sensor 28 first senses the draft A', and the fourth counter 107 counts the number of clock pulses in the same manner as aforesaid ($t_7$–$t_8$ in FIG. 23) until the fourth sensor 29 senses the draft A' and then stops. Said count number is input in the third comparison means 96 as the fourth count number and compared here with the predetermined second set number. In case the fourth count number is over the second set number, a drive signal is output from the output port P-3 for tilting the skew correction means 23' by $\beta$ degree counterclockwise.

Figure 24A:
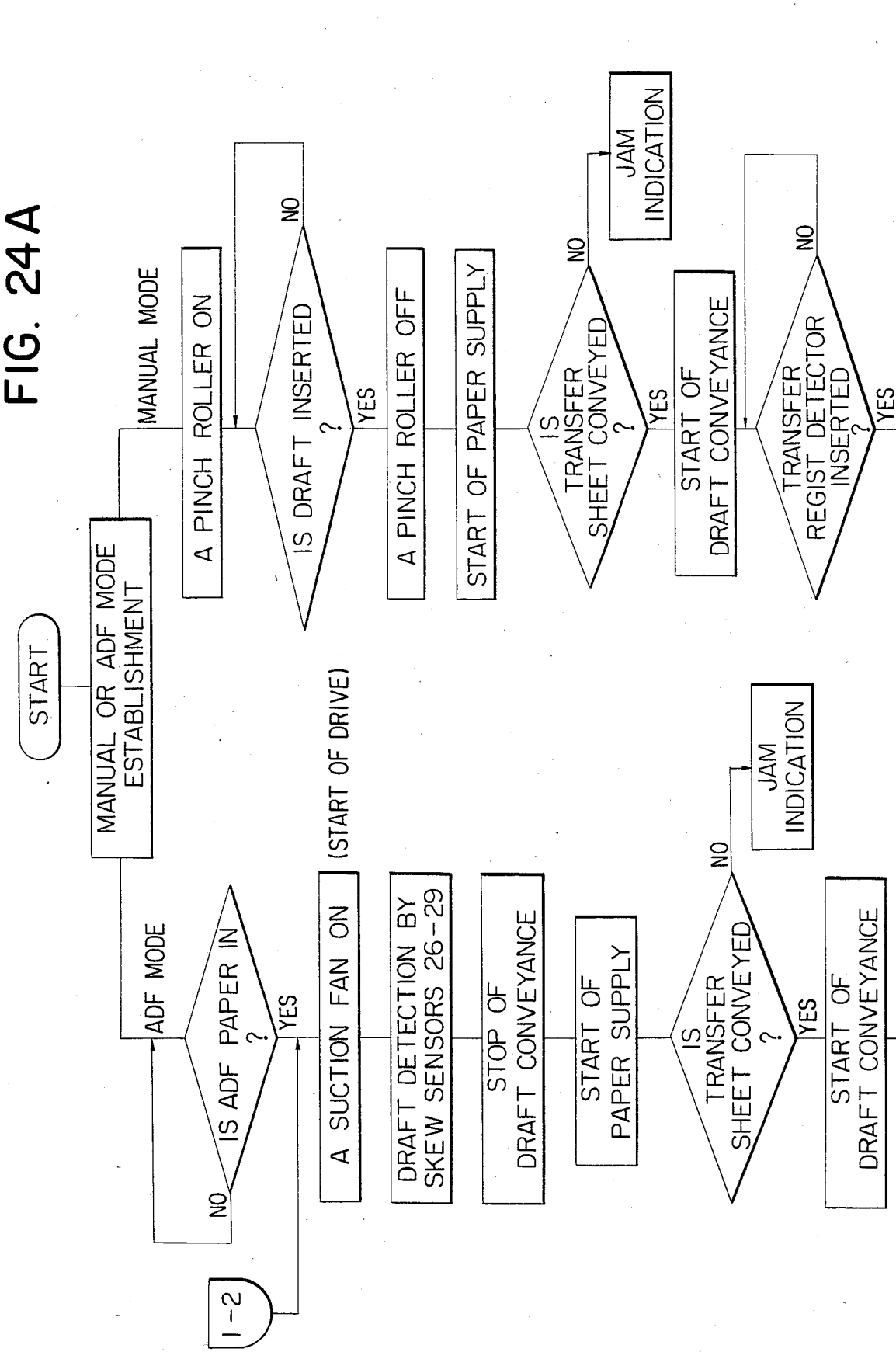
Figure 25A:
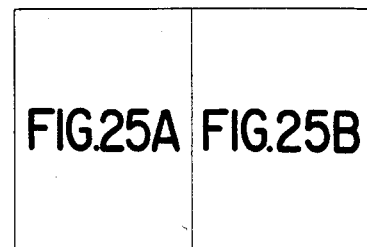
FIGS. 25A and 25B are flow diagrams of the microcomputer of the copying machine shown in FIG. 24.
Figure 25:
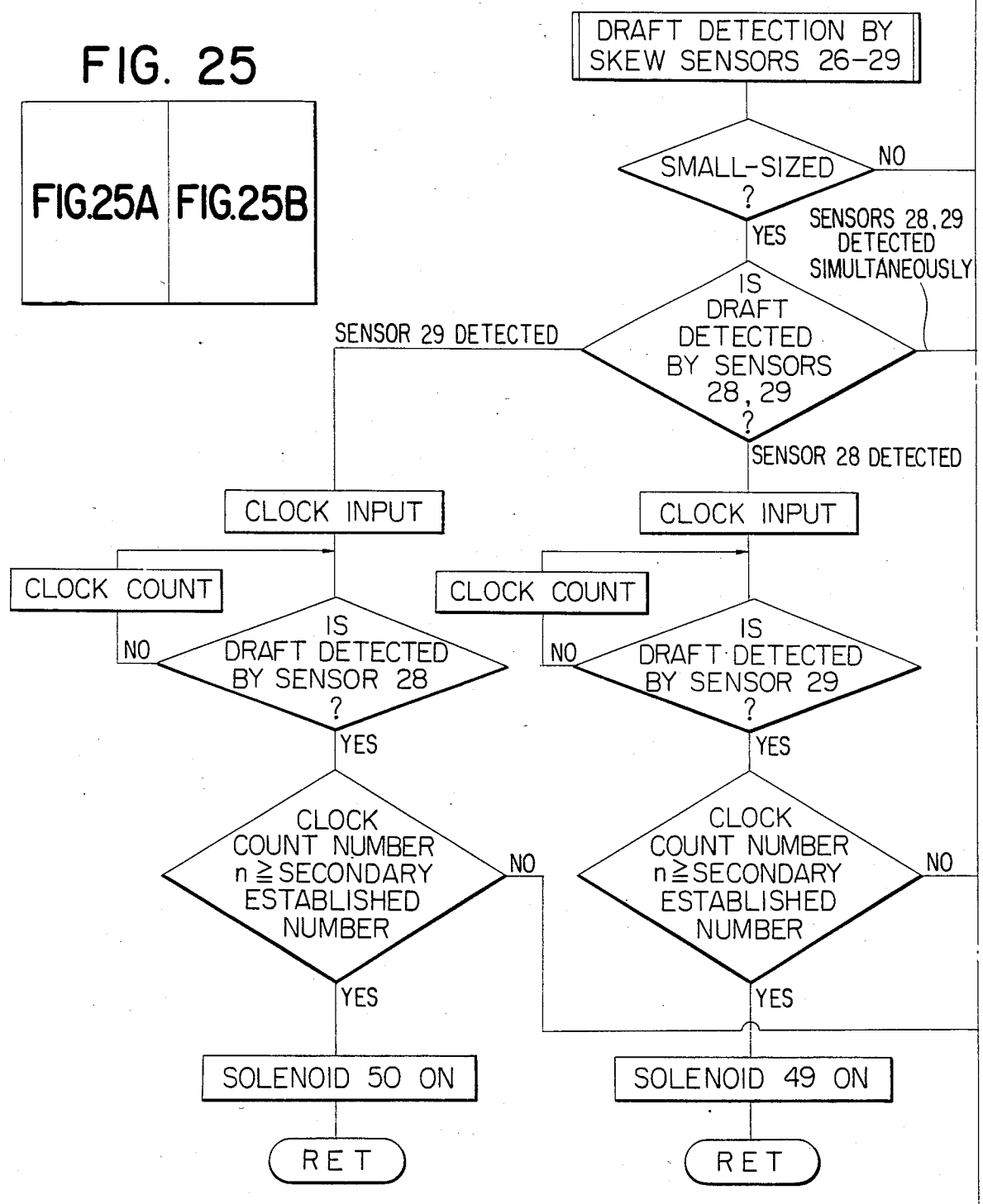
Figure 25B:
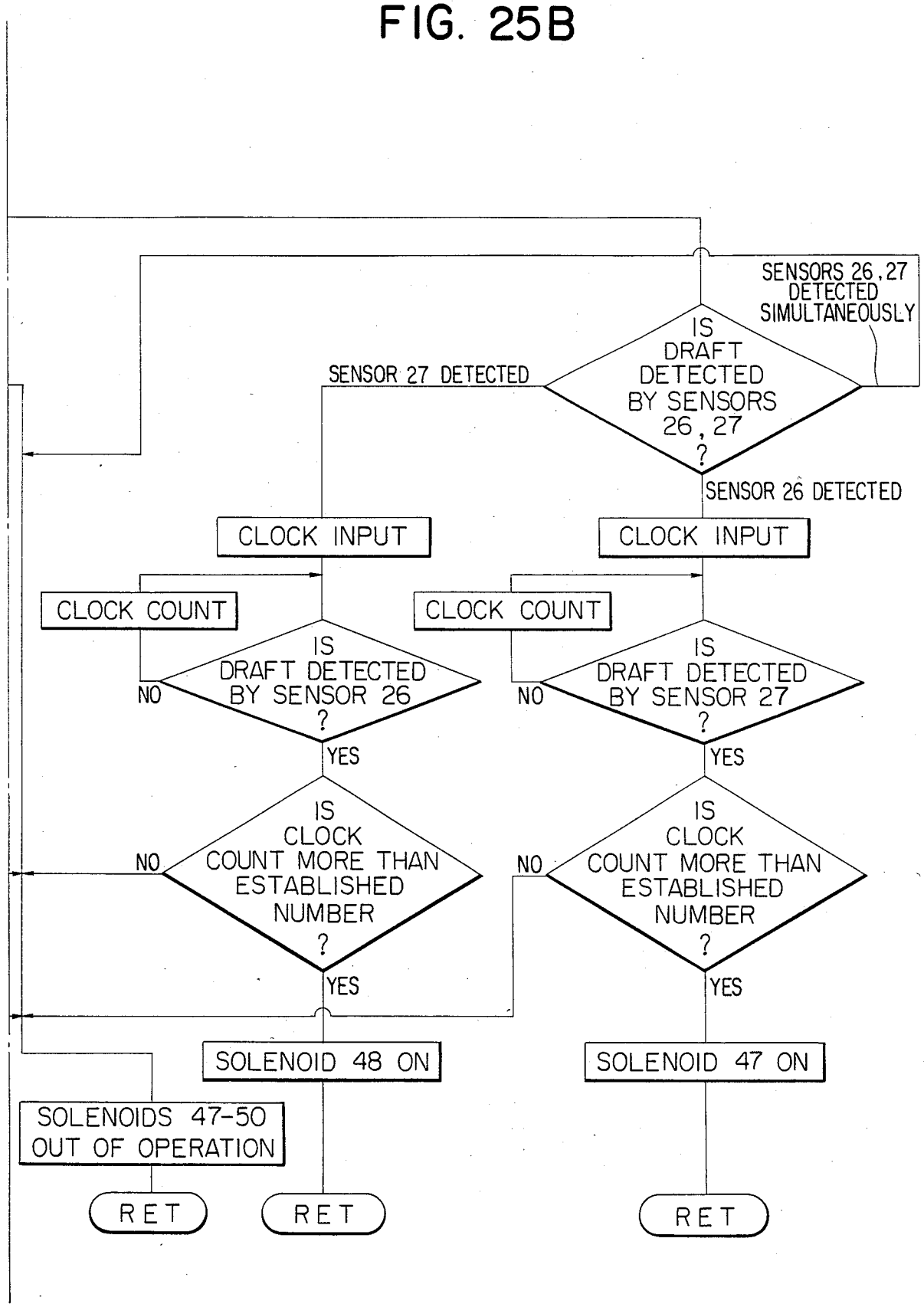
Figure 26:
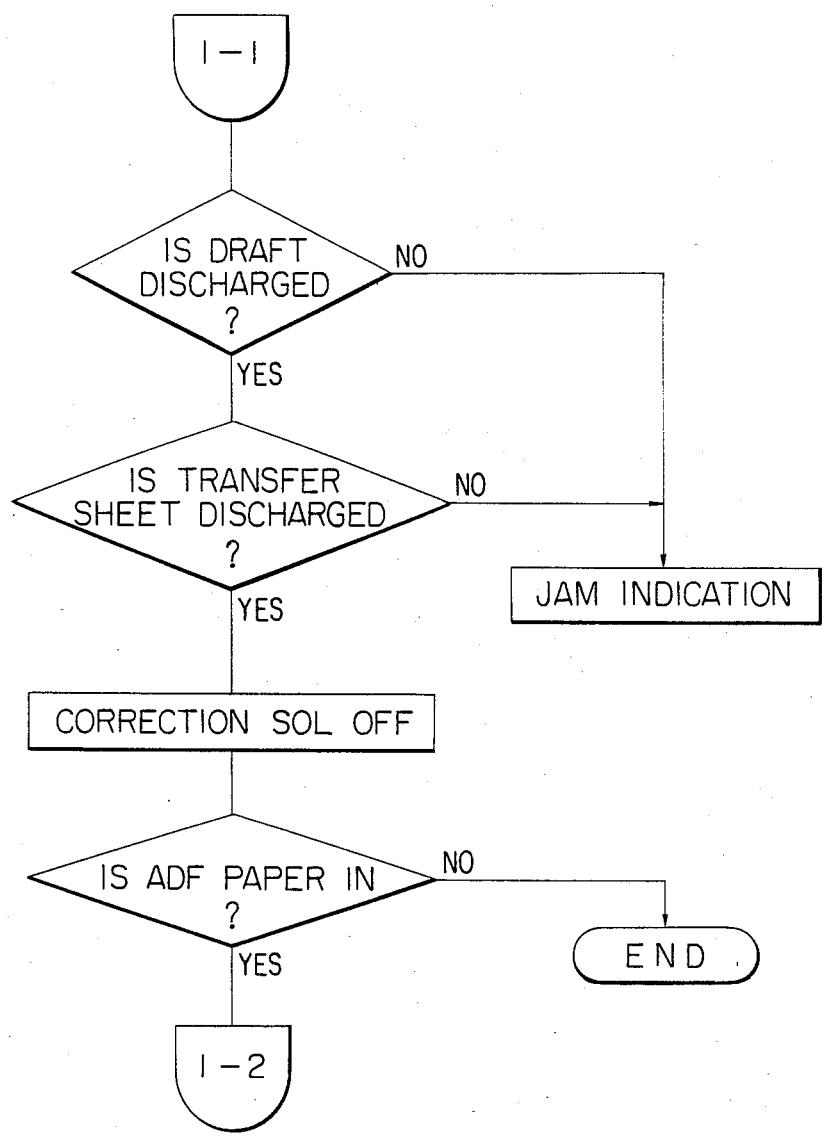
FIG. 26 is another flow diagram of the same as above.

Accordingly, even the skew of the draft of narrow width can be corrected to the full because the skew correction means 23' is tilted by $\beta$ degree ($>\alpha$). FIGS. 24 to 26 each illustrates a flow diagram of the microcomputer 90".

In case a detection signal is output from the first or second sensor 26 or 27 during the operation as mentioned above, the third and fourth comparison means 96, 97 are stopped by the action of the decision means of draft width 103 and the first stop means 104, while in case a detection signal is output from the third or fourth sensor 28 or 29 during the operation as mentioned above, the first and second comparison means 96, 97 are stopped by the action of the decision means of draft width 103 and the second stop means 105. Therefore, there is no possibility that the skew correction operation of both drafts of broad and narrow width is confused.

Although four skew sensors and four solenoids are provided respectively in this embodiment, it is needless to say that said skew sensors and solenoids may be provided respectively in larger numbers, even if even-numbered. It is also possible to arrange plural rows of skew correction means along the conveying direction of draft sheets as shown in the embodiment of FIG. 16. It is also possible to effect a more strict skew correction by controlling so as to switch the solenoids from outside to inside or from inside to outside during the skew correction operation.

Figure 27:
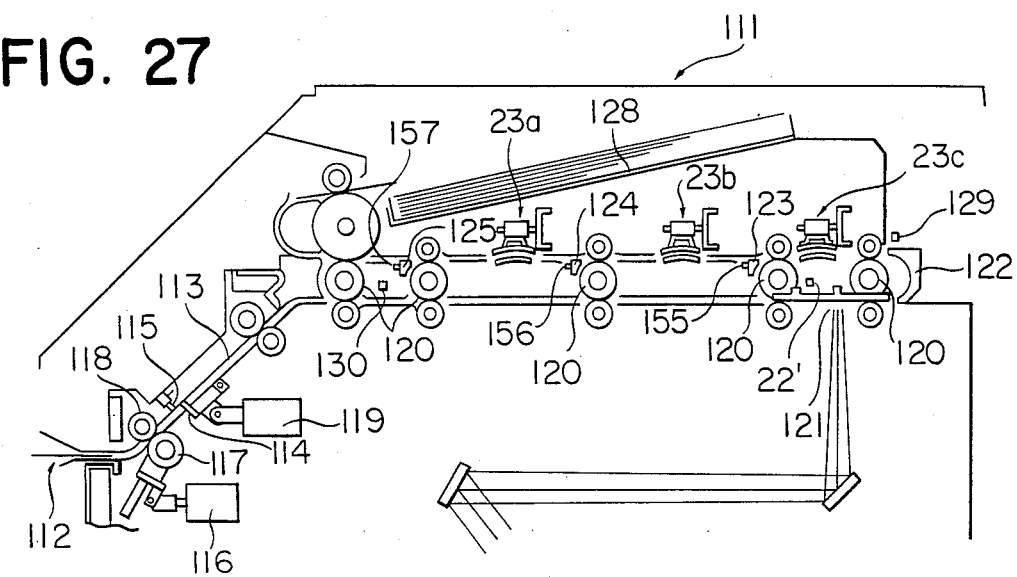
FIG. 27 is an elevational view of the embodiment of the draft sheet cycling type copying machine according to this invention.
Figure 28:
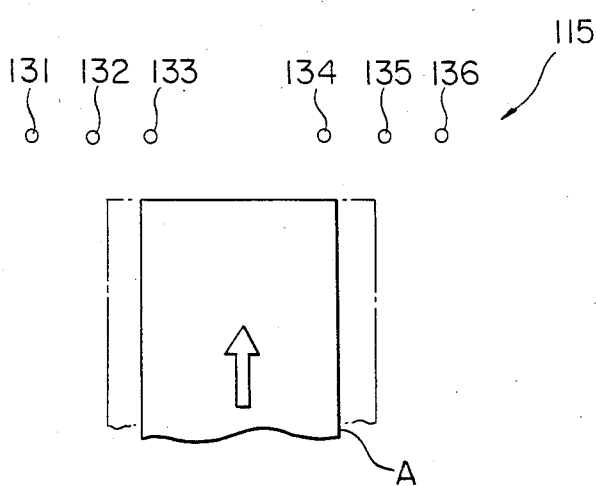
FIG. 28 is an arrangement view of sensing means of draft width of the copying machine shown in FIG. 27.

FIGS. 27 and 28 each illustrates the embodiment of having set the correction apparatus 11 in the draft cycling type copying machine 110. In the copying machine of this sort which is capable of generating a number of copies from a sheet of draft, the same draft is cycled many times within the same draft convey way and consequently the draft, which has first been arranged straight, is increased in the skewed amount gradually.

Figure 29:
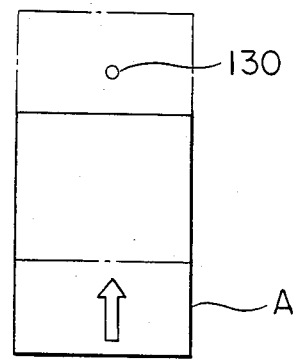
FIG. 29 is an arrangement view of sensing means of draft length of the copying machine shown in FIG. 27.

In FIG. 27, 112 denotes a draft charging port, 114 denotes a barrier which builds up from the draft charging port 112 and against which the front end of the draft fed in a conveying means 113 collides, and 117, 118 denote a pair of friction rollers disposed with the freedom of contacting with and parting from each other. 115 denotes a width sensor comprising sensor groups 131-136 disposed by three pieces at regular intervals on the right side and on the left side of the direction intersecting the center line of the convey way as shown in FIG. 28. When any of these sensors 131-136 senses the draft, a solenoid 116 is actuated so that the friction rollers 117, 118 hold the draft therebetween. 119 denotes a solenoid which is actuated by delay output of the solenoid 116 for separating the barrier 114 from the convey way, and 130 denotes a length sensor for the draft. This length sensor is disposed on the center line of the convey way as shown in FIG. 29. This length sensor 130 is designed to cooperate with the width sensor 115 for sensing the sizes of seven kinds of drafts. 120 denotes a convey roller, and 121 denotes an exposure slit. When the draft passes through this slip, an electrostatic latent image is formed on a photosensitive drum (not shown). 123-125 denote guide means which project on the convey way and guide the draft in each turning convey way comprising the convey roller or the like, 155-157 denote solenoids for projecting each guide means 123-125, and 128 denotes a draft receive member.

Figure 1:
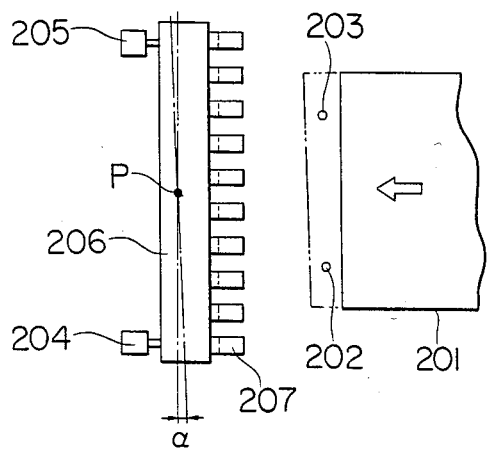
FIG. 1 is a schematic plan view of the skew correction means used in the conventional copying machine.
Figure 2:
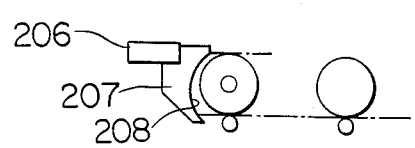
FIG. 2 is a front view of the said means shown in FIG. 1.
Figure 30:
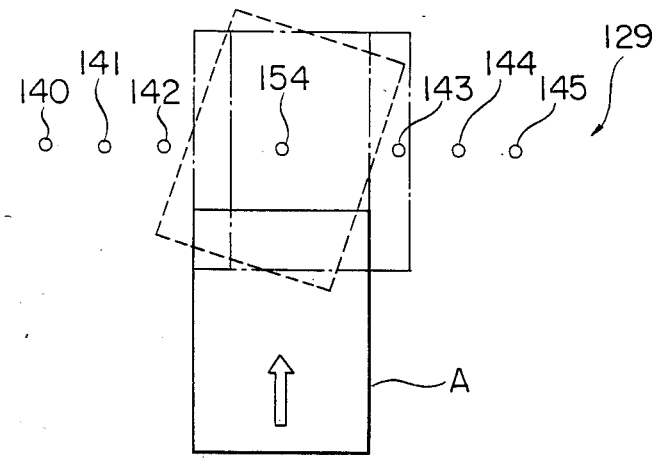
FIG. 30 is an arrangement view of sensing means of draft sideslip of the copying machine shown in FIG. 27.

The aforesaid structure is the same as the conventional draft cycling copying machine. In this embodiment, however, a curved turning means 122 is rigidly provided in place of correction means 206 of FIG. 1 provided usually in the turning convey way disposed between the upper and lower convey ways. This turning means 122 is provided with a sensor for sensing skew and sideslip of draft 129. This sensor 129 comprises right and left side sensor groups 140-145 disposed by three pieces in the direction intersecting the convey way as shown in FIG. 30 and a central sensor 154 disposed on the center line of the convey way so as to be in a straight line with these sensors 140-145. Among them, sensors 142, 143 are disposed so that a predetermined distance wider than for instance A4 size may be left there between as well as the center line of the convey way may be located at a halved position of this distance. The other sensors 140-142 and 143-145 are likewise disposed leaving the distance corresponding to the predetermined draft size therebetween. 23a-23c each denotes the same skew correction means as shown in FIG. 16, and 22' denotes a skew sensing means comprising the same sensors 26-29 as shown in FIG. 18.

Each of sensors 130, 131-136, 140-145 is constructed of a luminous diode, a photo transistor or the like as each of sensors 26-29 is done, and is designed to continuously output H level detection signal during its sensing period when sensing the draft.

Figure 31:
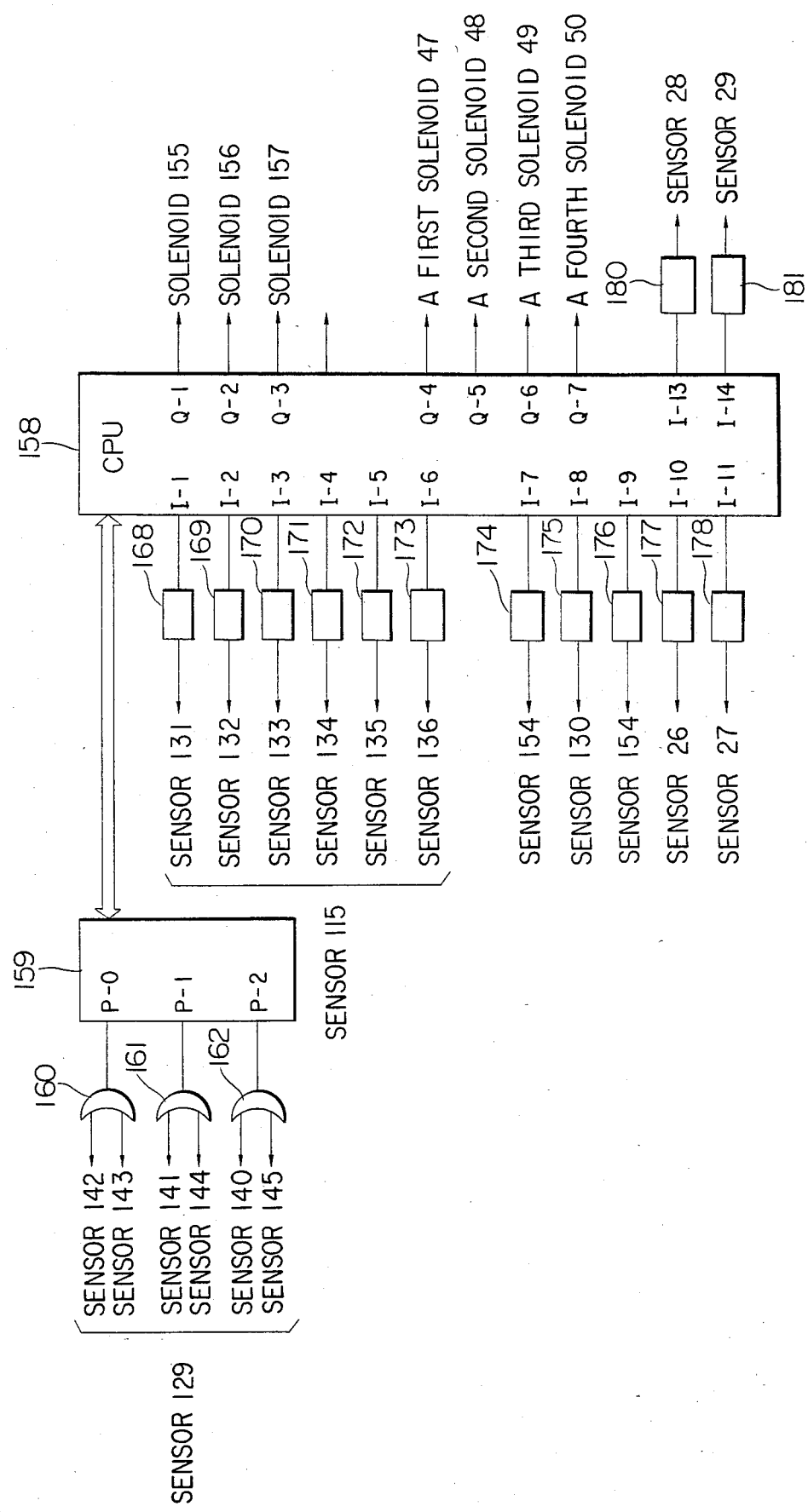
FIG. 31 is a circuit diagram used for controlling the copying machine of FIG. 27.
Figures 32, 33:
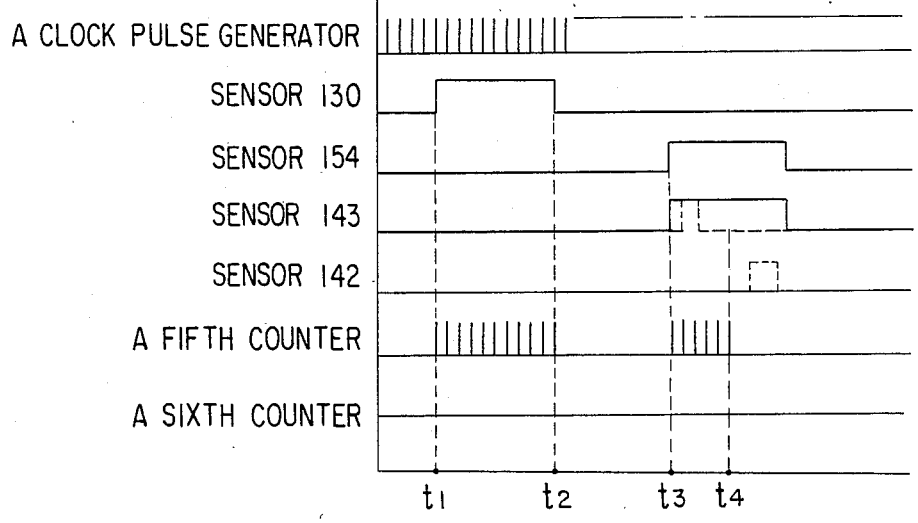
FIG. 32 is a data mask for use in preventing the copying machine of FIG. 27 from side-slipping.
FIG. 33 is a time chart of the correction apparatus for the copying machine of FIG. 27.

FIG. 31 is a block diagram of a control apparatus for controlling guide means 123-125 and skew correction means 23a-23c. 159 denotes an inlet and outlet apparatus. Input ports P-0-P-2 are connected with the left side sensors 140-142 paired with the right side sensors 143-145 respectively as shown in FIG. 30 through OR circuits. 158 denotes a microcomputer. This microcomputer includes a clock pulse generator (not shown) which generates a clock pulse at regular intervals, a fifth counter and a sixth counter (not shown) which count said clock pulses while sensors 130, 154 are sensing the draft, a seventh counter (not shown) which counts said clock pulses until the sensor 26 or 28 senses the draft and the sensor 27 or 29 (FIG. 18) senses the draft, and a eighth counter (not shown) which counts the clock pulses until the sensor 27 or 29 senses the draft and the sensor 26 or 28 (FIG. 18) senses the draft, and data masks corresponding to the sizes of draft are retained beforehand in its memory as shown in FIG. 32 for the purpose of sensing sideslip of the draft. Output ports Q-1-3 are each designed to a drive signal to actuate each solenoid 155-157, 47-50.

Next, explanation will be made on the operation of this embodiment.

When the draft is inserted in the draft charging port 112, the draft is sensed by sensors 131-136 of the width sensor 115 shown in FIG. 28. In case the draft A is for instance A4 sized, sensors 123, 134 sense the draft, and a detection signal is input in the input ports I-3, I-4 of the microcomputer 158 through amplifiers 170, 171. When the draft A is conveyed, the length sensor 130 shown in FIG. 29 senses the draft between $t_1$-$t_2$ in FIG. 33 and inputs a detection signal in the input port I-8 of the microcomputer 158 through an amplifier 175.

The fifth counter (not shown) included in the microcomputer 158 counts the number of clock pulses output from the clock pulse generator (not shown) included in the microcomputer during its sensing period. The microcomputer 158 calculates the draft size from said count number and the detection signals from said sensors 131-136.

In the case of preparing plural copies, if said draft size is A4, the microcomputer 158 outputs a drive signal from the output port Q-1. The solenoid 155 is thereby actuated to make the guide means 123 project in the convey way and form a convey loop.

If the draft is of another size, the guide means 124, 125 corresponding to said size are projected. And, the draft is cycled in the formed convey loop and copying is effected every time when the draft passes through the exposure slit 121. The predetermined number of copies are thus prepared.

When the draft is guided in the convey way by the turning means 122 in this instance, the center sensor 154 shown in FIG. 30 senses the draft ($t_3$ in FIG. 23), and a detection signal is input in the input port I-6 of the microcomputer 158 through an amplifier 174. When the sixth counter (not shown) included in the microcomputer 158 counts the number of said clock pulses and this count number reaches ½ of the number counted by the fifth counter ($t_4$ in FIG. 33), the microcomputer 158 reads the signals input in the input ports P-0-2 of the inlet and outlet apparatus 159 and compares it with the previously stored data masks of A4 shown in FIG. 32. If the signal is input in the input ports P-0-2 corresponding to 1 of the data masks of A4, the draft is judged to undergo sideslip, and output of a drive signal from the output port Q-1 is stopped.

If the draft A undergoes sideslip at the place shown with the chain line in FIG. 30 in this instance, the right side sensor 143 senses the draft A and so a signal is input in the input port P-0. As the position of P-0 of data masks of A4 is 1, the draft A is judged to undergo sideslip. Likewise, in the case of B4, if the draft undergoes sideslip rightwards, the right side sensors 143, 144 sense the draft and so signals are input in the input ports P-0, P-1. As the position of P-1 of data masks of B4 is 1, the draft is judged to undergo sideslip. If normal, the signal is input in the input port P-0 alone and the position of P-0 of data masks of B4 is 0. Therefore, the draft is not judged to undergo sideslip. In the cases of the other draft sizes, likewise, comparison is made with the data masks corresponding to respective sizes, and in case the signal is input in the input ports P-0-2 corresponding to 1 of the data masks the draft is judged to undergo sideslip.

When the draft A undergoes sideslip, output of the drive signal output from the output port Q-1 is stopped.

Due to this, the guide means 123 is retracted, and the draft A is conveyed in the draft receive member 128. In the cases of the other draft sizes, likewise, output of the drive signals output from the output ports Q-2, 3 is stopped. Due to this, the guide means 124, 125 are retracted, and the draft is conveyed in the draft receive member 128.

Sideslip of the draft is sensed by the sensor 154 and the sixth counter when said draft reaches the position shown with the chain line in FIG. 30. The reason is that in case the draft is skewed as shown with the dotted line, it is feared that sensors 142, 143 sense the draft and judge it to undergo sideslip and said fear must be removed.

In case the draft A' is skewed as shown with the chain line in FIG. 18, the included eighth counter counts the number of clock pulses output from the included clock pulse generator during the period extending from sensing of the draft A' by the sensor 29 to sensing of the draft A' by the sensor 28. When this count number is over the predetermined number, a drive signal is output from the output port Q-7 to actuate the solenoid 50 so as to tilt the skew correction means 23a by β degree clockwise with the pivotal post 31 as the fulcrum, whereby the skew is corrected. In case the draft A is skewed in the direction opposite to that illustrated, the solenoid 49 is actuated so as to tilt the skew correction means 23a by β degree counterclockwise.

In the case of the large sized draft A, solenoids 48, 47 are actuated so as to tilt the skew correction means 23a by α degree clockwise or counterclockwise with the pivotal post 31 as the fulcrum.

Figure 34A:
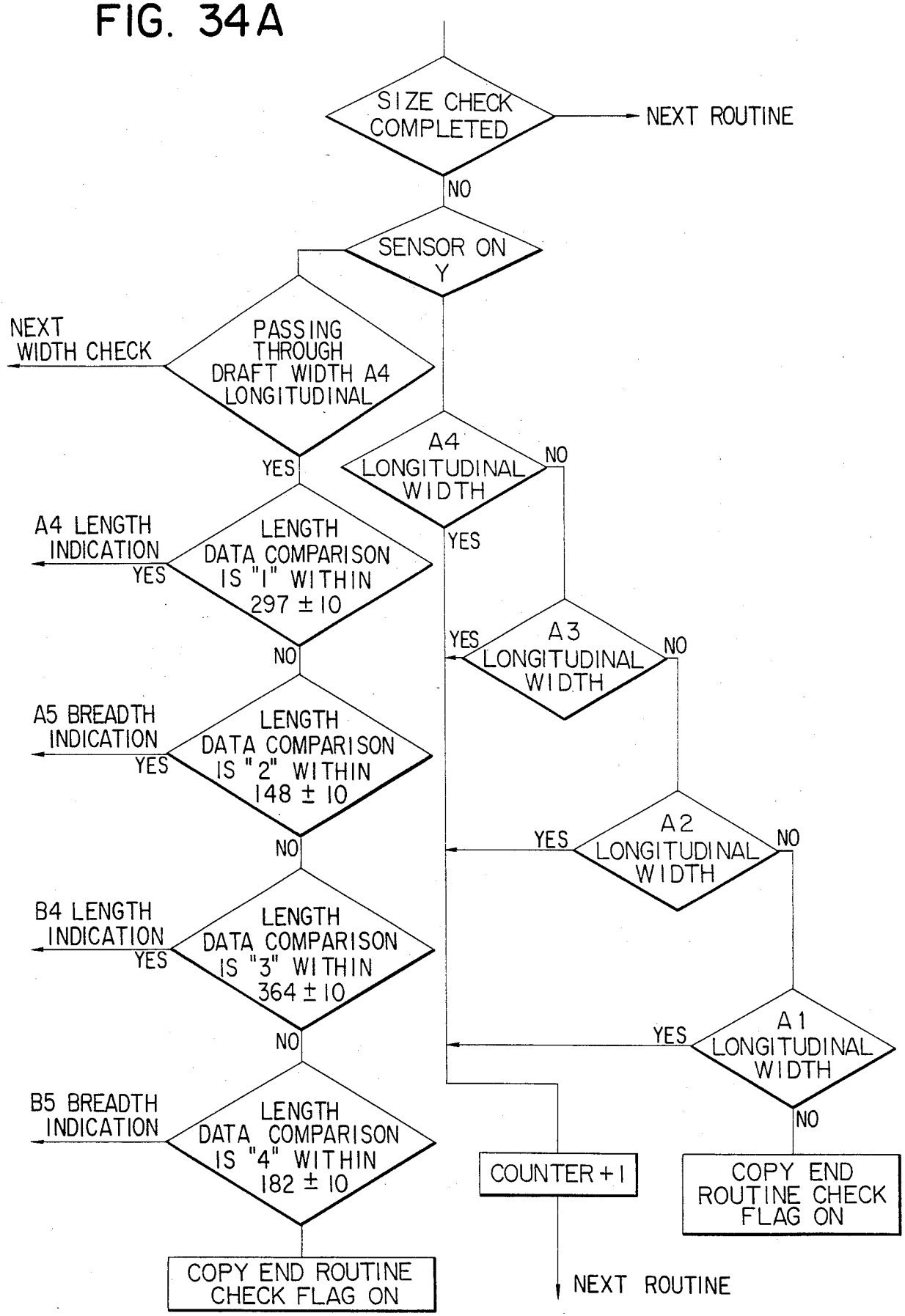
FIGS. 34A, 34B and 34C are each an operation flow diagram of the copying machine shown in FIG. 27.
Figure 34B:
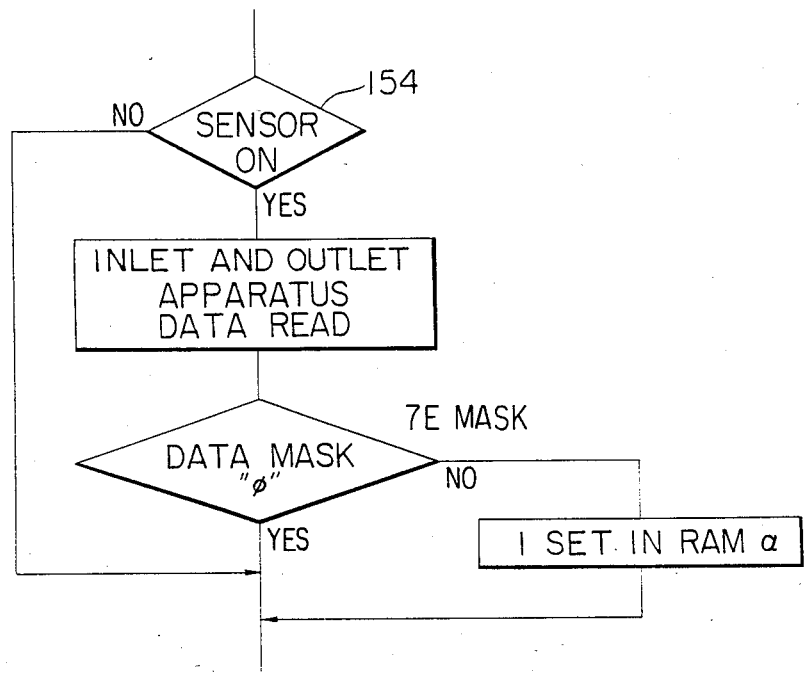
Figure 34C:
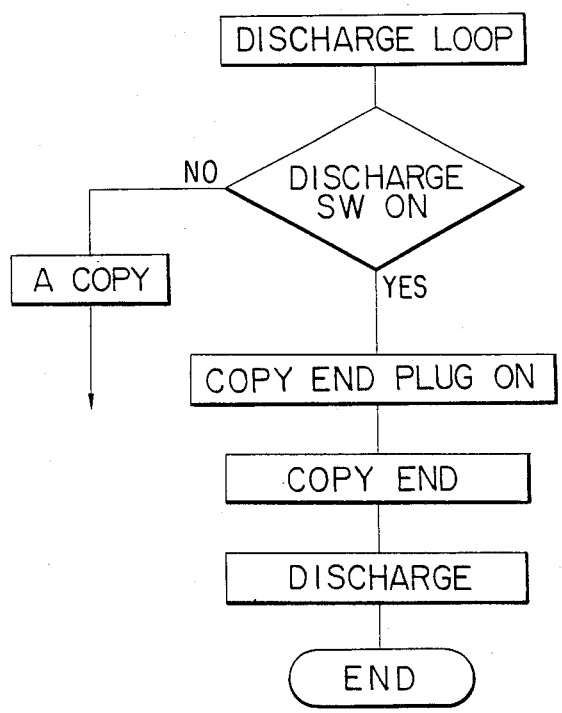

FIGS. 34A-34C each denotes a flow diagram of the microcomputer 168.

In the embodiment shown in FIG. 27, three guide means 123-125 are employed. However, it is needless to say that the number of guide means may be increased or decreased according to the sizes of the drafts. At that time, the number of sensor groups in sensors 115, 139, the number of input-output terminals of the microcomputer and the inlet and outlet apparatus, and the like must be increased or decreased corresponding to the draft sizes.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A copying machine which takes copies of a draft sheet by slit exposure while it is being conveyed, said machine including holding means supported pivotally on a copying machine body so as to turn round the center line of a convey way for said draft sheet, a correction means which is attached to said holding means and comprises a pair of curved plates leaving therebetween a sufficient distance for forming a curved convey way constituting a part of said convey way, and a draft correction apparatus comprising skew correction means having at least a pair of driving means which are attached to the copying machine body on both sides of the center line of the convey way and connected to said holding means for turning the holding means, skew sensing means which are provided corresponding to said driving means on both sides of the center line of the convey way upstream of said correction means and have sensors for sensing the draft sheet and a control means which inputs the detection signals from said sensors and actuates said driving means when the detection signal becomes over a tolerable skew amount, wherein when said holding means is in its neutral position the passing through distance of the draft sheet becomes equal covering the whole scope of the direction of width of the convey way for said correction means, and when the holding means is turned round the the center line of the convey way to either side from its neutral position there is caused difference in the passing through distance of the draft sheet between one side and the other side of the convey way for the correction means.

2. A copying machine according to claim 1 wherein said driving means comprise a first driving means and a second driving means, said sensors comprise a first sensor which outputs a first detection signal and a second sensor which outputs a second detection signal, and said control means has a clock pulse generator which generates clock pulses at regular intervals, a first counter which can input said first detection signal and said clock pulses, a second counter which can input said second detection signal and said clock pulses, said first counter counting the number of clock pulses covering the period from input of the first detection signal to input of the second detection signal to thereby output a first count signal, said second counter counting the number of clock pulses covering the period from input of the second detection signal to input of the first detection signal to thereby output a second count signal, and further a first drive signal output means and a second drive signal output means which input the first count signal and the second count signal respectively to thereby output a first drive signal and a second drive signal corresponding to count signal values, the first drive means and the second drive means being designed to input the first drive signal and the second drive signal and turn the correction means by the amounts corresponding to drive signal values.

3. A copying machine according to claim 1 wherein said driving means comprise a first driving means and a second driving means, said sensors comprise a first sensor which outputs a first detection signal and a second sensor which outputs a second detection signal, and said control means has a clock pulse generator which generates clock pulses at regular intervals, a first counter which can input said first detection signal and said clock pulses, a second counter which can input said second detection signal and said clock pulses, said first counter counting the number of clock pulses covering the period from input of the first detection signal to input of the second detection signal to thereby output a first count signal, said second counter counting the number of clock pulses covering the period from input of the second detection signal to input of the first detection signal to thereby output a second count signal, further comparison means which input the first count signal and the second signal for comparing the input signals with a correctable maximum skew amount set beforehand and output non-correctable signals when the first and the second count signals are over said maximum set amount, and stop means which input said non-correctable signals for stopping the operation of said copying means.

4. A copying machine according to claim 1, comprising plural skew correction means disposed in a series along the conveying direction of draft sheet of a convey way, the distance between drive means in each correction means is enlarged with the progress from this side of the conveying direction of draft sheet to the front, and said control means compares detection signals output from said skew sensing means with plural numbers set according to the numbers of skew correction means and outputs in order from said drive means of large distance to those of small distance every time when the number of the detection signals is over said set number to thereby actuate drive means in order according to the number of said detection signals.

5. A copying machine according to claim 1 wherein said drive means comprise at least four first, second, third and fourth drive means, the first and the second drive means being located symmetrically far from the center line of said convey way, the third and the fourth drive means being located symmetrically near the center line of said convey way, said sensors comprise the first, the second, the third and the fourth sensors of the same number with said drive means and are disposed on the same side as the first, the second, the third and the fourth drive means relative to the center line of the convey way to thereby output a first, a second, a third and a fourth detection signals respectively, said control means has a clock pulse generator which generates clock pulses at regular intervals, a third counter which can input said first and second detection signals and said clock pulses and a fourth counter which can input said third and fourth detection signals and said clock pulses, said third counter counting the number of clock pulses covering the period from input of the first detection signal to input of the second detection signal when the first detection signal is input or the number of clock pulses covering the period from input of the second detection signals to input of the first detection signal when the second detection signal is input so as to output a third count signal, said fourth counter counting the number of clock pulses covering the period from input of the third detection signal to input of the fourth detection signal when the third detection signal is input or the number of clock pulses covering the period from input of the fourth detection signal to input of the third detection signal when the fourth detection signal is input so as to output a third count signal, and further said control means has the first and the second comparison means which input the third count signal, compare it with a first set number set beforehand and output a first drive signal and a fourth drive signal and a second drive signal when the third count signal is over said first set number and the third and the fourth comparison means which input the fourth count signal, compare it with a second set number set beforehand and output a third drive signal and a fourth drive signal when the fourth count signal is over said second set number, said first, second, third and fourth drive means being designed to input the first, the second, the third and the fourth drive signals and tilt the correction means by predetermined angles.

6. A copying machine according to claim 3 further including decision means of draft width which are designed to input the first, the second, the third and the fourth detection signals as well as output a broad-wide signal when the first or the second detection signal is input and a narrow-wide signal when the third or the fourth detection signal alone is input, a first stop means which stops the operation of the third and the fourth comparison means when said broad-wide signal is input, and a second stop means which stops the operation of the first and the second comparison means when said narrow-wide signal is input, wherein said first, second, third and fourth drive means are designed to tilt correction means by predetermined angles when the first, the second, the third and the fourth drive signals are input.

7. A copying machine including a lower convey way for conveying a draft sheet from a draft charging port to an exposure slit, an upper convey way which is formed above this lower convey way so as to convey the draft sheet having been conveyed to said exposure slit to a draft receive member, a turning convey way which is disposed between said lower and upper convey ways so as to turn the draft sheet, plural guide means which appear and disappear in the upper convey way so as to cycle the draft sheet to the lower convey way, a draft length sensor disposed in the lower convey way, and a transfer means for projecting one of said guide means selectively answering to a length signal output from this length sensor, said copying machine further including a draft correction apparatus which comprises holding means supported pivotally on a copying machine body so as to turn round the center line of said convey way between guide means of said upper convey way, a correction means which is attached to said holding means and comprises a pair of curved guide plates leaving therebetween a sufficient distance for forming a curved convey way constituting a part of said convey way, skew correction means having at least a pair of driving means which are attached to the copying machine body at both sides of the center line of said convey way and connected to said holding means for turning the holding means, skew sensing means which are provided corresponding to said driving means on both sides of the center line of the convey way upstream of said correction means and have skew sensors for sensing skew of the draft sheet and a control means which inputs the detection signals from said both sensors and actuates said driving means selectively when the skew amount becomes over a tolerable skew amount corresponding to the length of said draft sheet, wherein when said holding means is in its neutral position the passing through distance of the draft sheet becomes equal covering the whole scope of the direction of width of the convey way for said correction means and when the holding means is turned round said center line of said convey way between said guide means of said upper convey way to either side from its neutral position there is caused difference in the passing through distance of the draft between one side and the other side of the convey way for the correction means.

8. A copying machine according to claim 7 wherein the distance between drive means in each correction means is enlarged with the progress from this side of the conveying direction of draft sheet to the front, and said control means compares detection signals output from said skew sensing means with plural numbers set according to the numbers of skew correction means and outputs in order from said drive means of large distance to those of small distance every time when the number of the detection signals is over said set number to thereby actuate drive means in order according to the number of said detection signals.

9. A copying machine according to claim 7 including a sensor for sensing sideslip of draft having a central sensor which is disposed on the beginning end side of said upper convey way as well as at the substantially central position of said convey way and outputs a central signal on sensing a draft passing through its established position and right and left side sensors which are disposed leaving therebetween a predetermined distance larger than the width of the draft as well as symmetrically relative to the center line of the upper convey way at positions arranged in a straight line with said central sensor in the direction intersecting the conveying direction and output right and left side signals on sensing the draft passing through their established positions, a clock pulse generator which generates clock pulses at regular intervals, a fifth counter which inputs a length signal generated by said length sensor and clock pulses, counts the number of clock pulses and outputs a fifth count signal corresponding to the length of the draft, a sixth counter which inputs said central signal and clock pulses, counts the number of clock pulses and outputs a sixth count signal, a comparison means which compares said fifth count signal with said sixth count signal and outputs a comparison signal when the count number of the sixth count signal reaches $\frac{1}{2}$ of that of the fifth count signal, and a stop means which outputs a stop signal when said comparison signal and a left side or right side signal are input simultaneously, wherein said transfer means is designed to input said stop signal and retract the projecting guide means.

* * * * *